(12) United States Patent
Ikeda et al.

(10) Patent No.: US 10,423,283 B2
(45) Date of Patent: Sep. 24, 2019

(54) INFORMATION PROCESSING SYSTEM, INFORMATION PROCESSING METHOD AND PROGRAM

(71) Applicant: SONY CORPORATION, Tokyo (JP)

(72) Inventors: Tetsuo Ikeda, Tokyo (JP); Hiroshi Saito, Tokyo (JP); Maya Kamachi, Kanagawa (JP); Yu Hayashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/541,576

(22) PCT Filed: Feb. 23, 2016

(86) PCT No.: PCT/JP2016/000952
§ 371 (c)(1),
(2) Date: Jul. 5, 2017

(87) PCT Pub. No.: WO2016/157703
PCT Pub. Date: Oct. 6, 2016

(65) Prior Publication Data
US 2017/0351383 A1    Dec. 7, 2017

(30) Foreign Application Priority Data

Mar. 31, 2015  (JP) ................................ 2015-073833

(51) Int. Cl.
*G06F 3/042*  (2006.01)
*G06F 3/01*   (2006.01)
(Continued)

(52) U.S. Cl.
CPC ............ *G06F 3/0425* (2013.01); *G06F 3/011* (2013.01); *G06F 3/0481* (2013.01); *G06F 16/23* (2019.01); *G06F 16/435* (2019.01)

(58) Field of Classification Search
CPC ........ G06F 3/0425; G06F 3/11; G06F 3/0481; G06F 16/435; G06F 16/23
See application file for complete search history.

(56) References Cited

U.S. PATENT DOCUMENTS 7,397,464 B1    7/2008  Robbins et al.
9,280,776 B2 *  3/2016  Wiswell ............ G06F 17/30867
(Continued)

FOREIGN PATENT DOCUMENTS

JP    2001-297400 A    10/2001
JP    2006-003969 A    1/2006
(Continued)

OTHER PUBLICATIONS

Apr. 9, 2019, Japanese Office Action issued for related JP Application No. 2015-073833.

(Continued)

*Primary Examiner* — Lixi C Simpson
(74) *Attorney, Agent, or Firm* — Paratus Law Group, PLLC

(57) ABSTRACT

There is provided an information processing apparatus including circuitry configured to control output of a first content according to first content information, determine information related to a real object which is different from a manipulation body used for content selection or object manipulation by a user, and control output of a second content, which is different from the first content, according to second content information, wherein the second content information is based on the first content information and the determined information related to the real object.

21 Claims, 26 Drawing Sheets

(51) Int. Cl.
*G06F 3/0481* (2013.01)
*G06F 17/30* (2006.01)
*G06F 16/23* (2019.01)
*G06F 16/435* (2019.01)

(56) References Cited

U.S. PATENT DOCUMENTS

| | | | |
|---|---|---|---|
| 9,925,456 B1* | 3/2018 | Hershey | A63F 13/2145 |
| 2005/0226505 A1 | 10/2005 | Wilson | |
| 2005/0245302 A1* | 11/2005 | Bathiche | A63F 13/00 463/1 |
| 2006/0092170 A1* | 5/2006 | Bathiche | A63F 13/02 345/589 |
| 2008/0167913 A1* | 7/2008 | Wiswell | G06Q 20/102 705/14.54 |
| 2009/0325686 A1* | 12/2009 | Davis | G07F 17/32 463/25 |
| 2010/0177931 A1* | 7/2010 | Whytock | G06F 3/0416 382/103 |
| 2010/0328225 A1 | 12/2010 | Black | |
| 2012/0001939 A1* | 1/2012 | Sandberg | G01C 21/3682 345/633 |

FOREIGN PATENT DOCUMENTS

| | | |
|---|---|---|
| JP | 2006-048672 | 2/2006 |
| JP | 2010-515970 A | 5/2010 |
| JP | 2012-503786 A | 2/2012 |
| JP | 2013-125470 A | 6/2013 |
| JP | 2014-002605 A | 1/2014 |

OTHER PUBLICATIONS

Apr. 30, 2019, European Communication issued for related EP Application No. 16711901.5.

Leitner et al., IncreTable, a mixed reality tabletop game experience, International Conference on Advances in Computer Entertainment Technology, Dec. 3-5, 2008, pp. 9-16, Yokohama, Japan.

Xambó et al., Let's Jam the Reactable: Peer Learning during Musical Improvisation with a Tabletop Tangible Interface, ACM Transactions on Computer-Human Interaction, Dec. 2013, pp. 1-34, vol. 20, No. 6.

Khalilbeigi et al., ObjecTop: Occlusion Awareness of Physical Objects on Interactive Tabletops, Proceedings of the 2013 ACM international conference on Interactive tabletops and surfaces, Its '13, Oct. 6-9, 2013, pp. 1-10, St. Andrews, United Kingdom.

* cited by examiner

[Fig. 1]
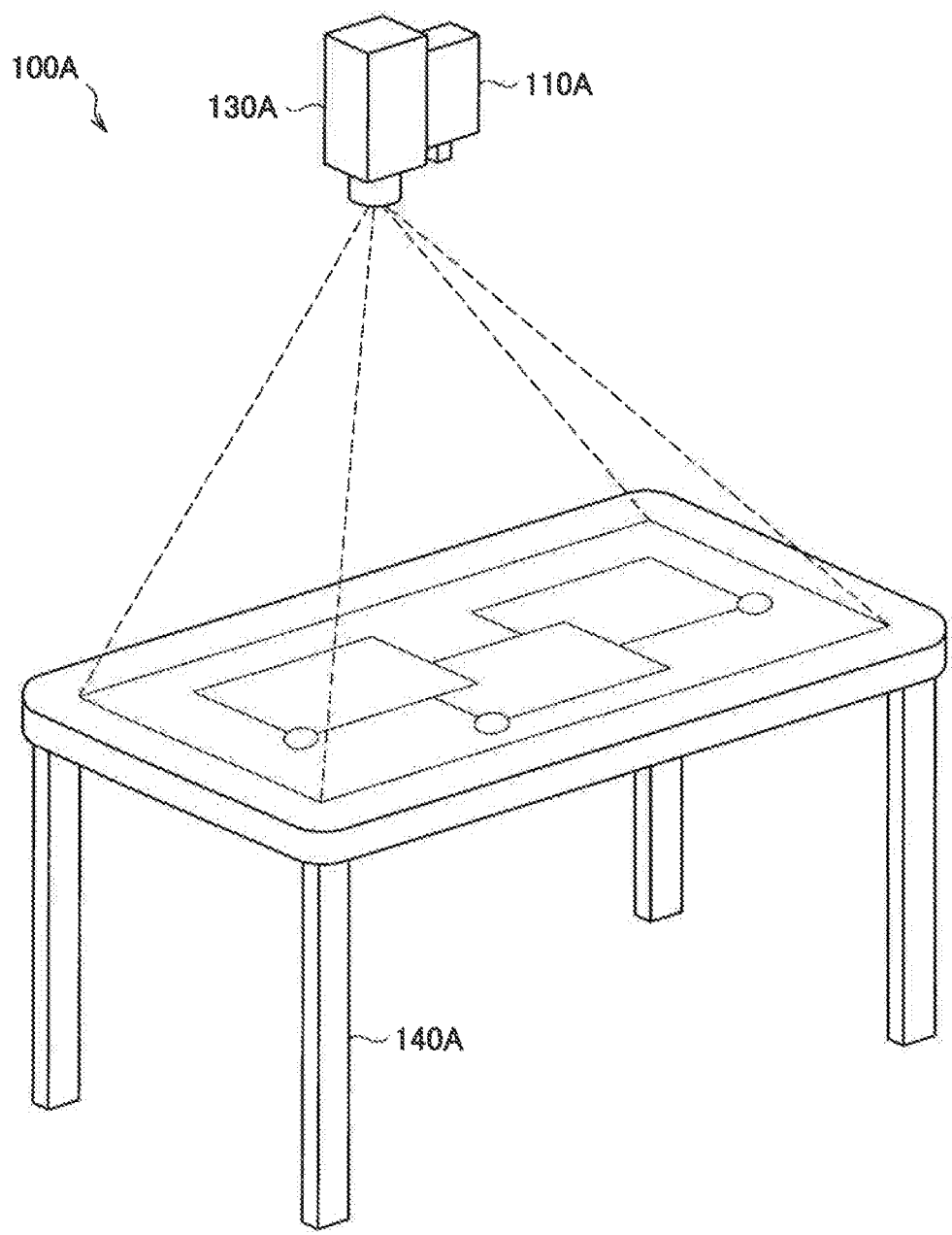

[Fig. 2]
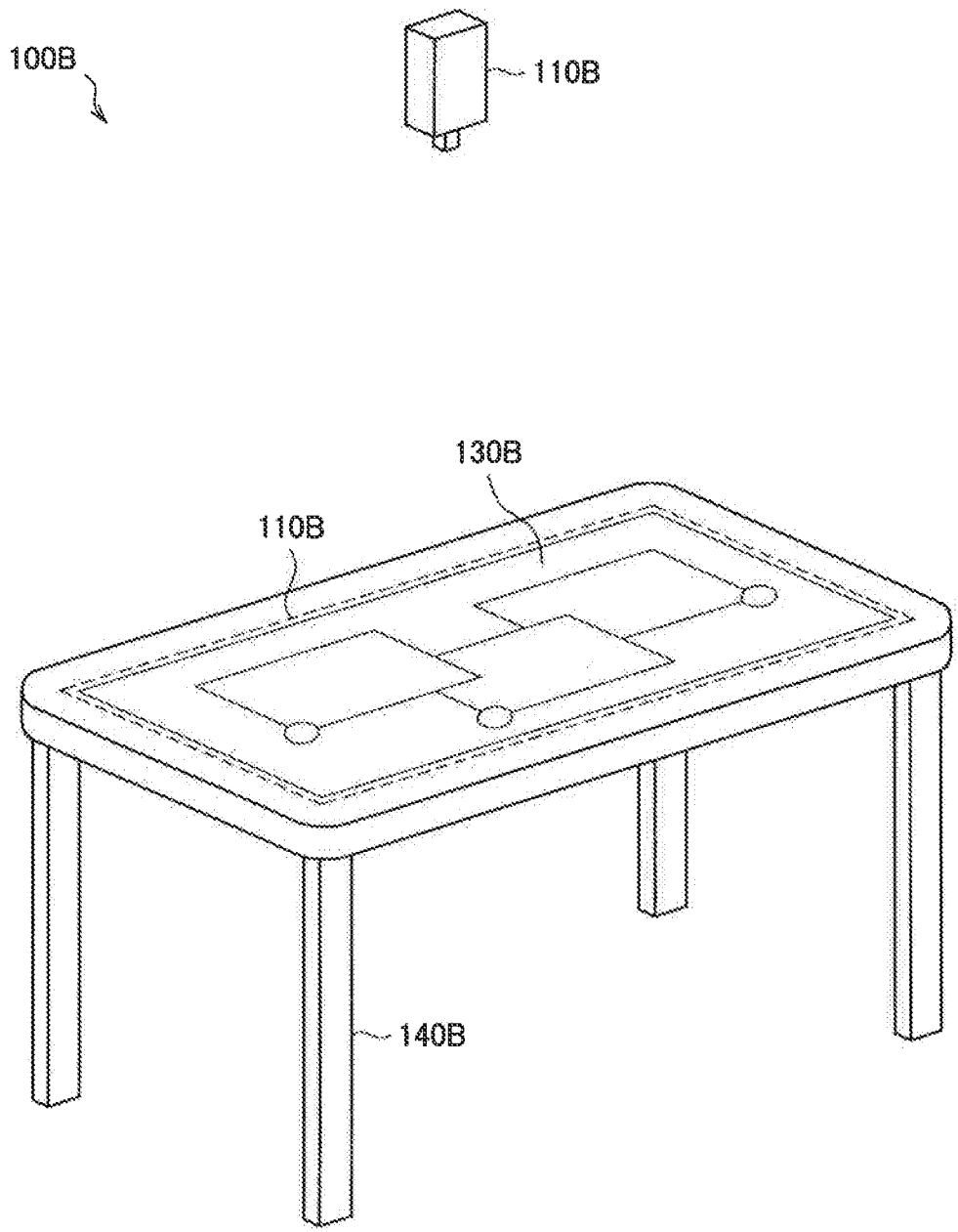

[Fig. 3]
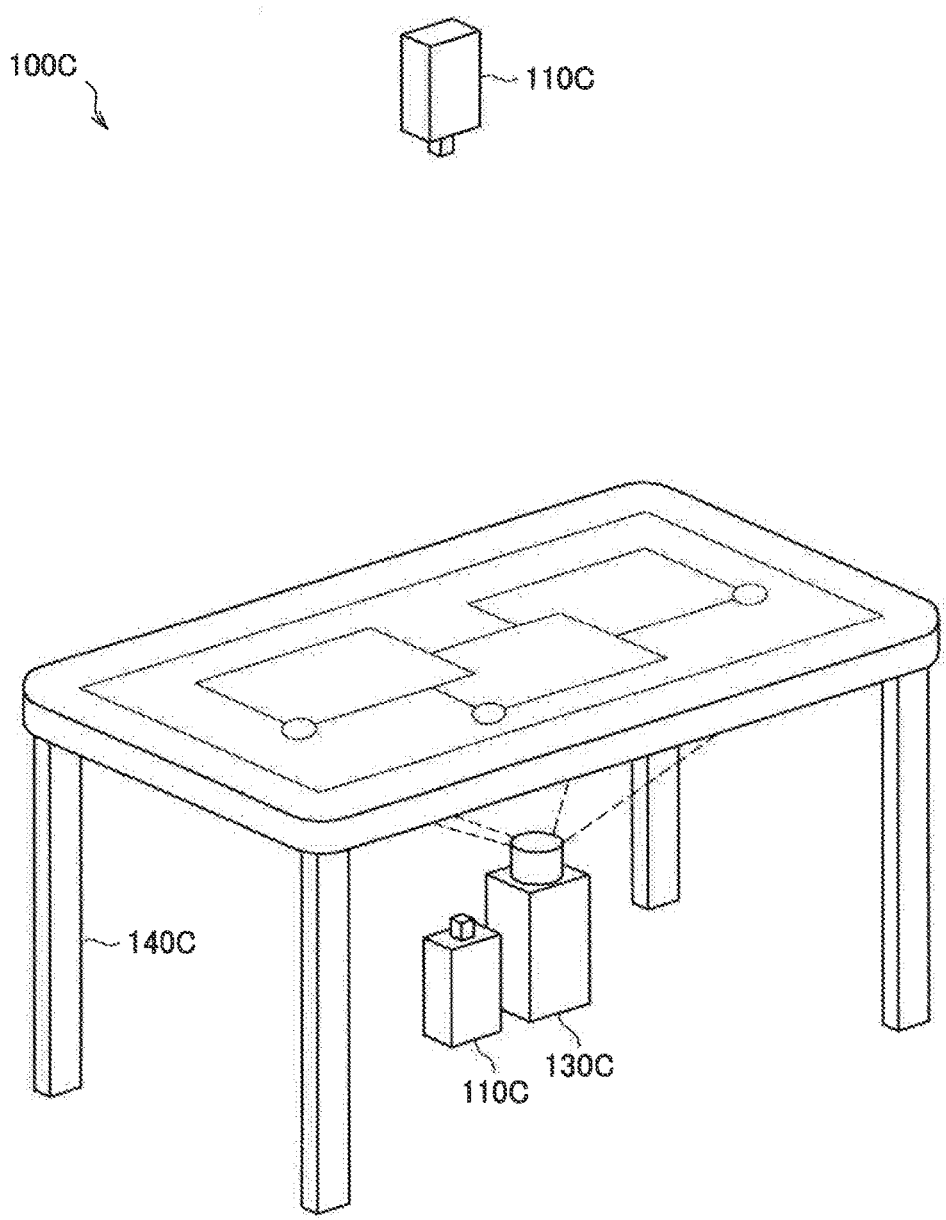

[Fig. 4]
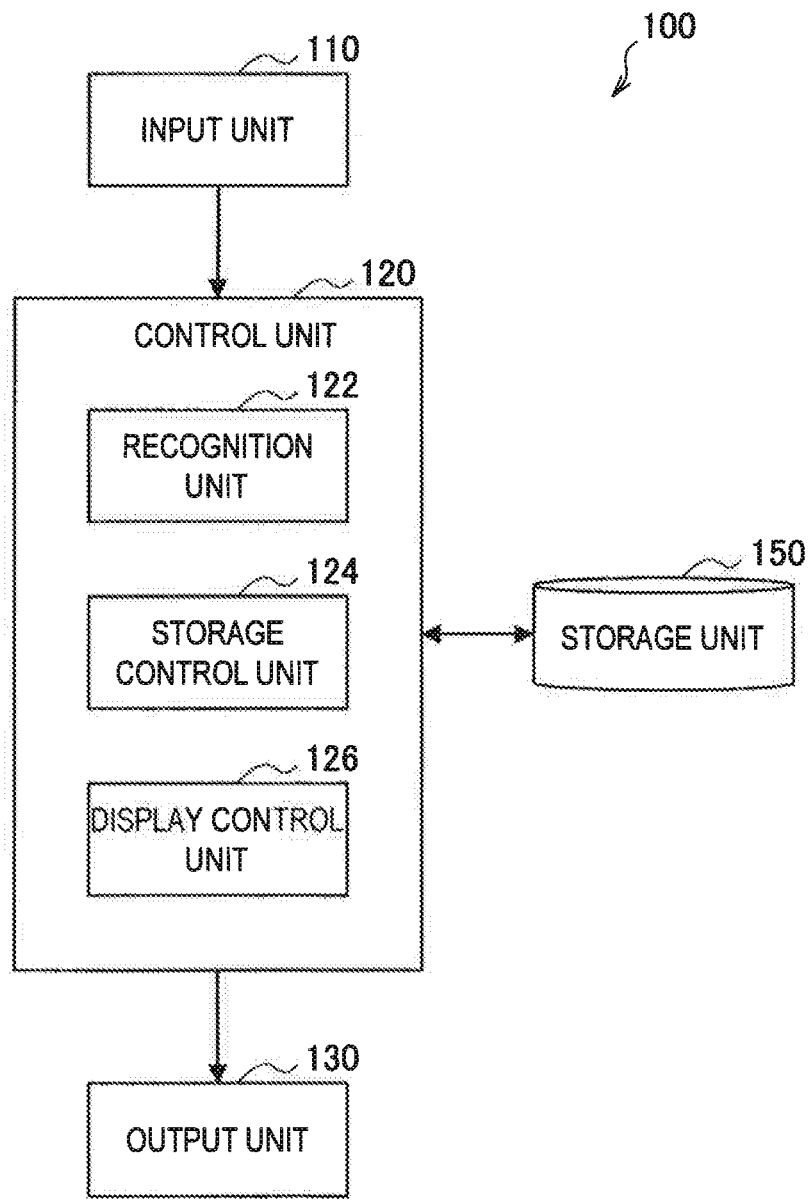

[Fig. 5]
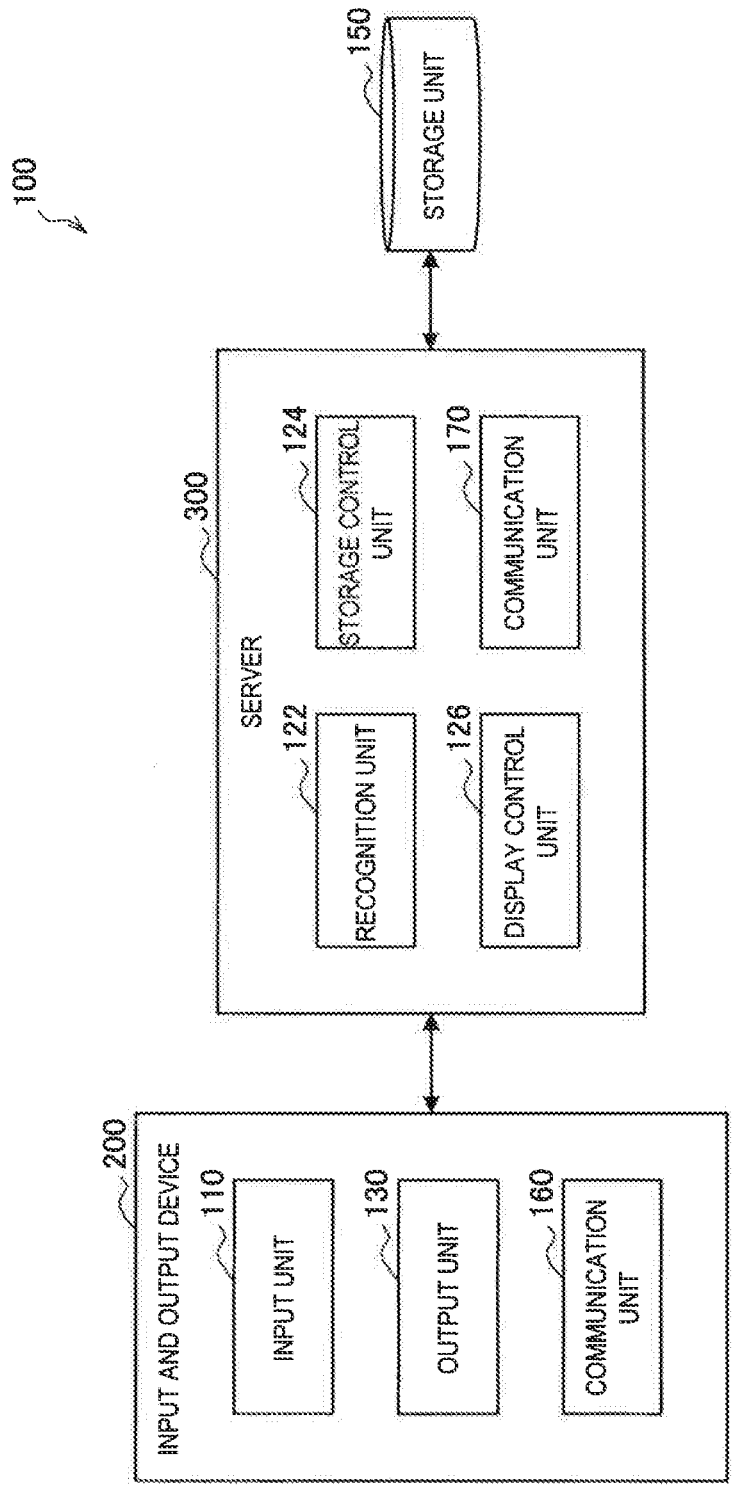

[Fig. 6]
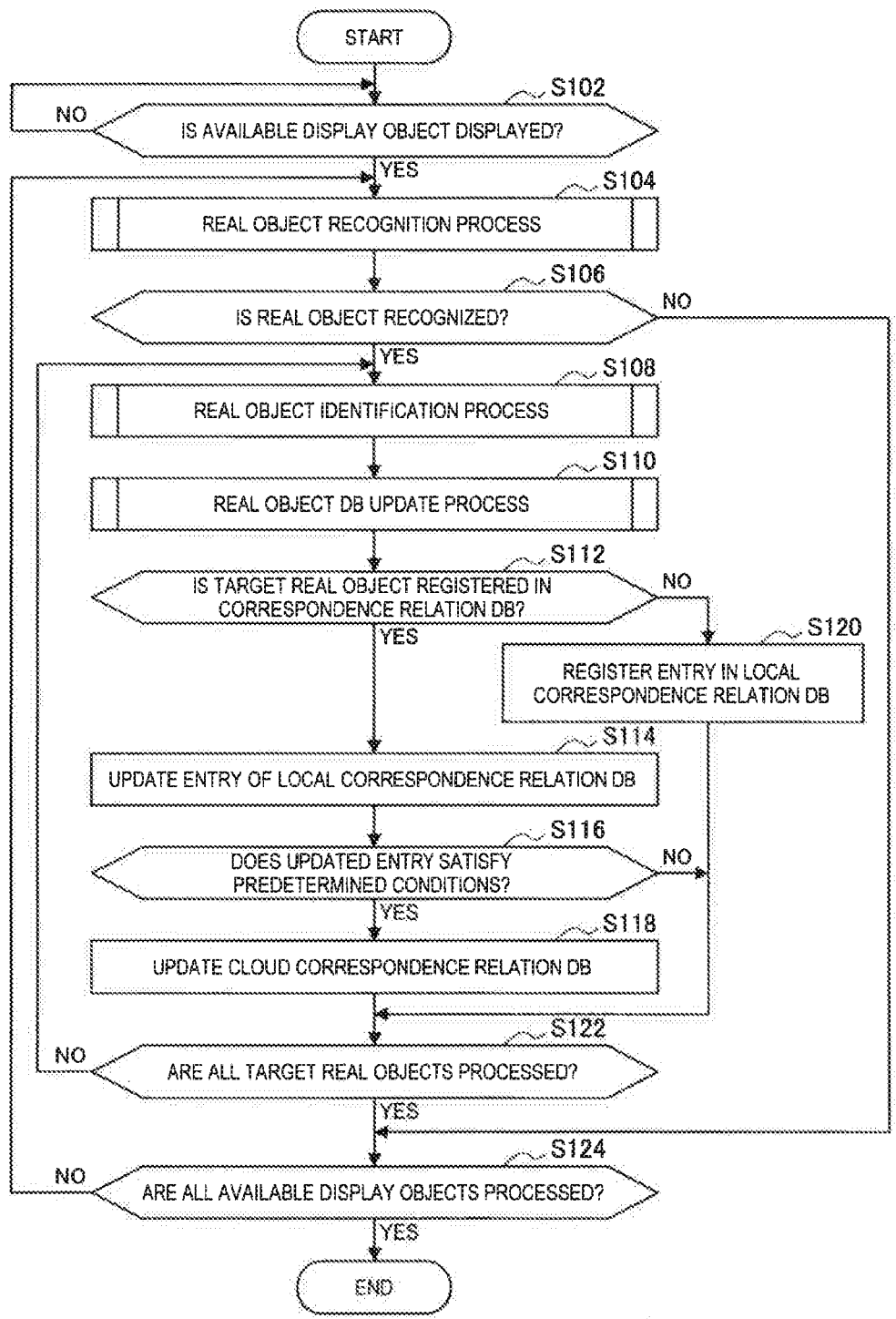

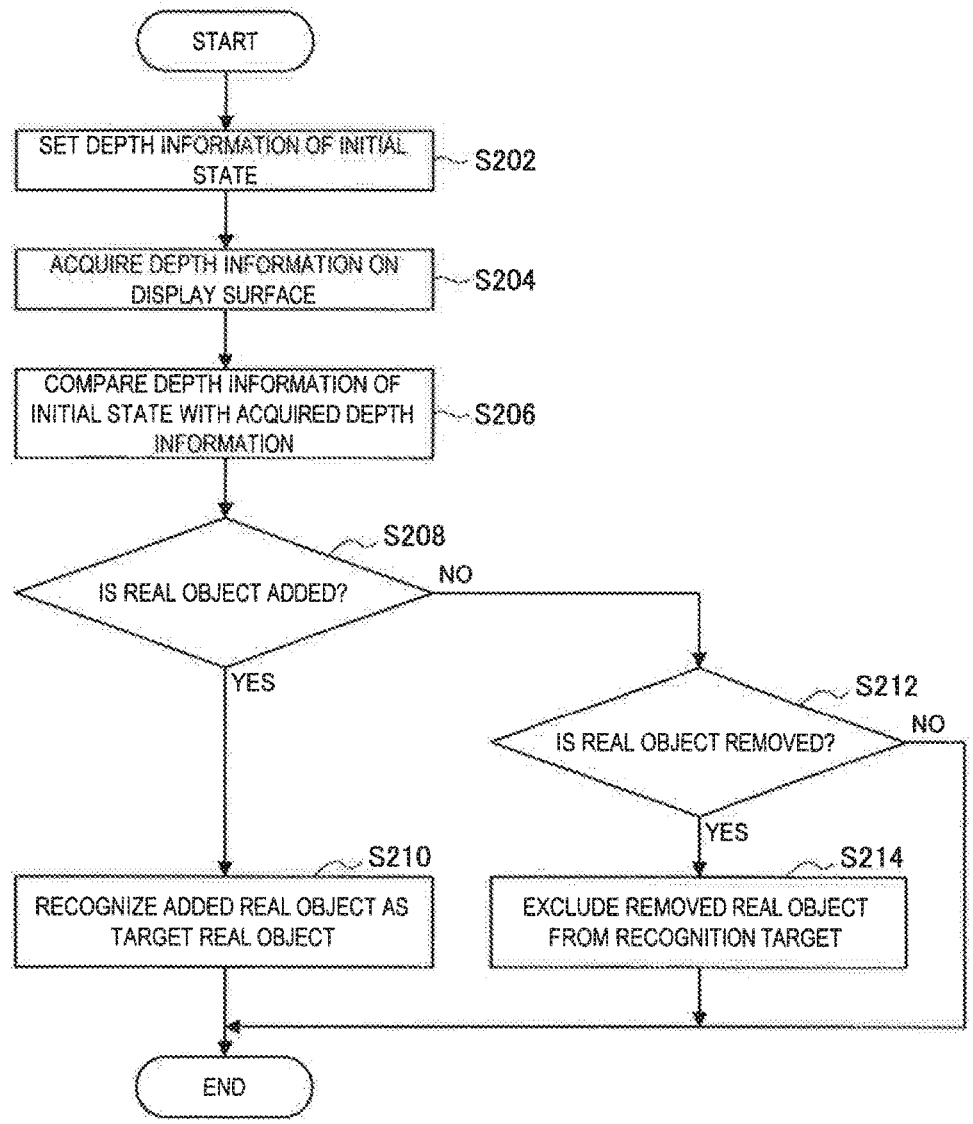
[Fig. 7]

[Fig. 8]
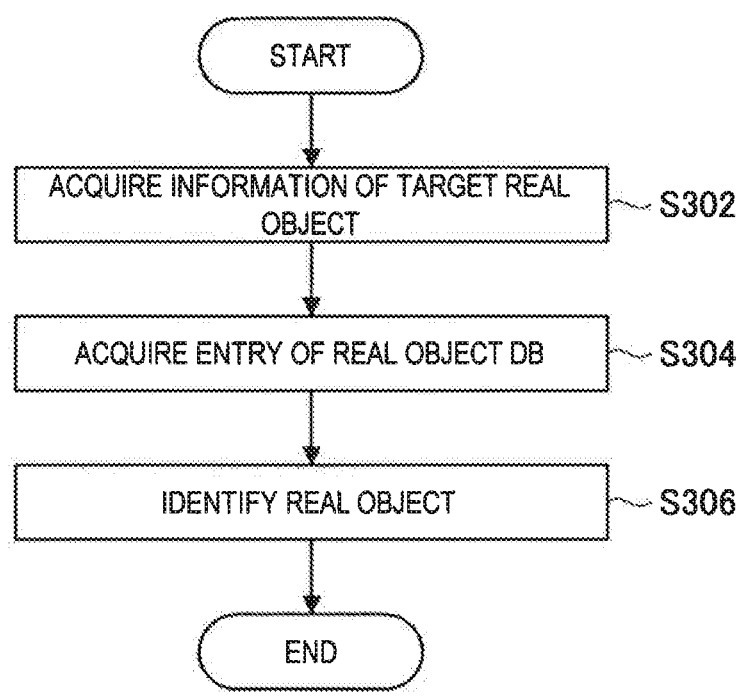

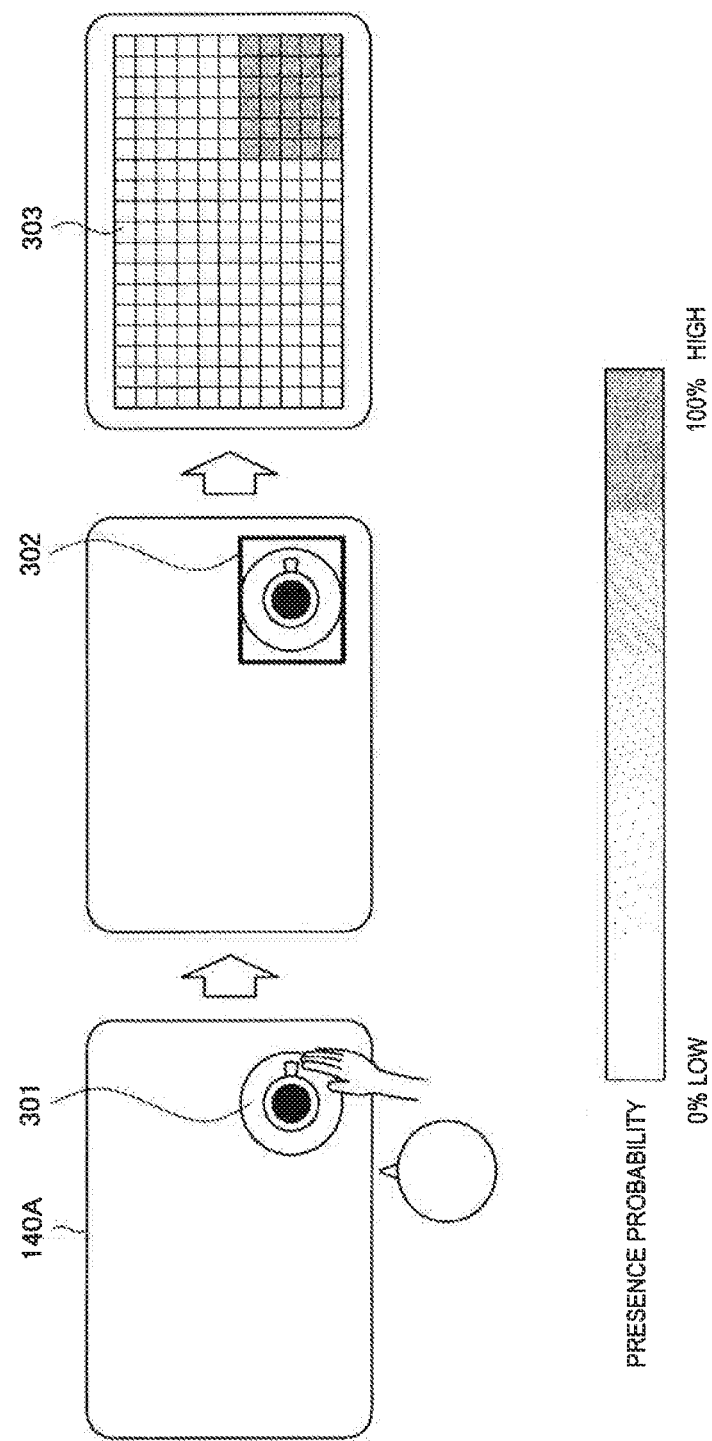
[Fig. 9]

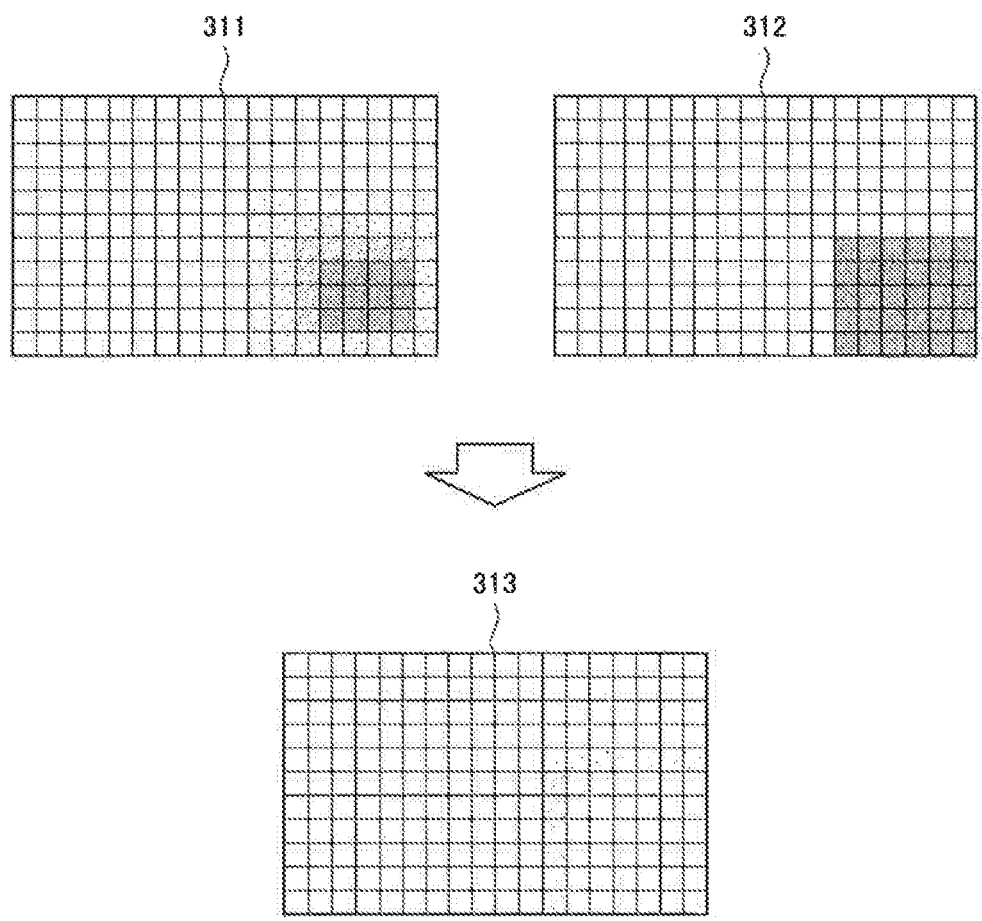
[Fig. 10]

[Fig. 11]
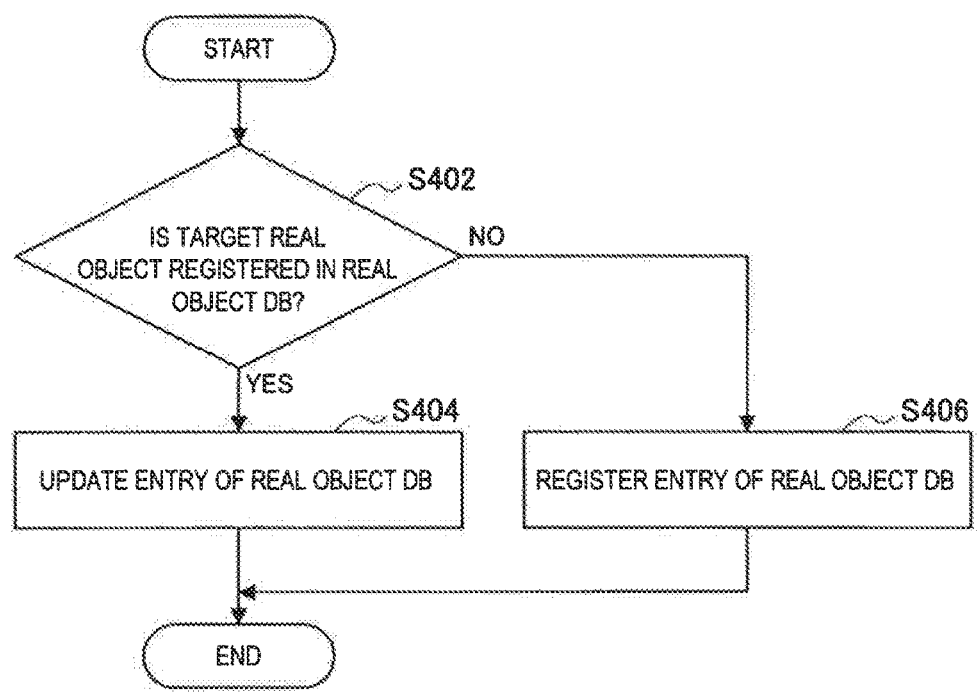

[Fig. 12]
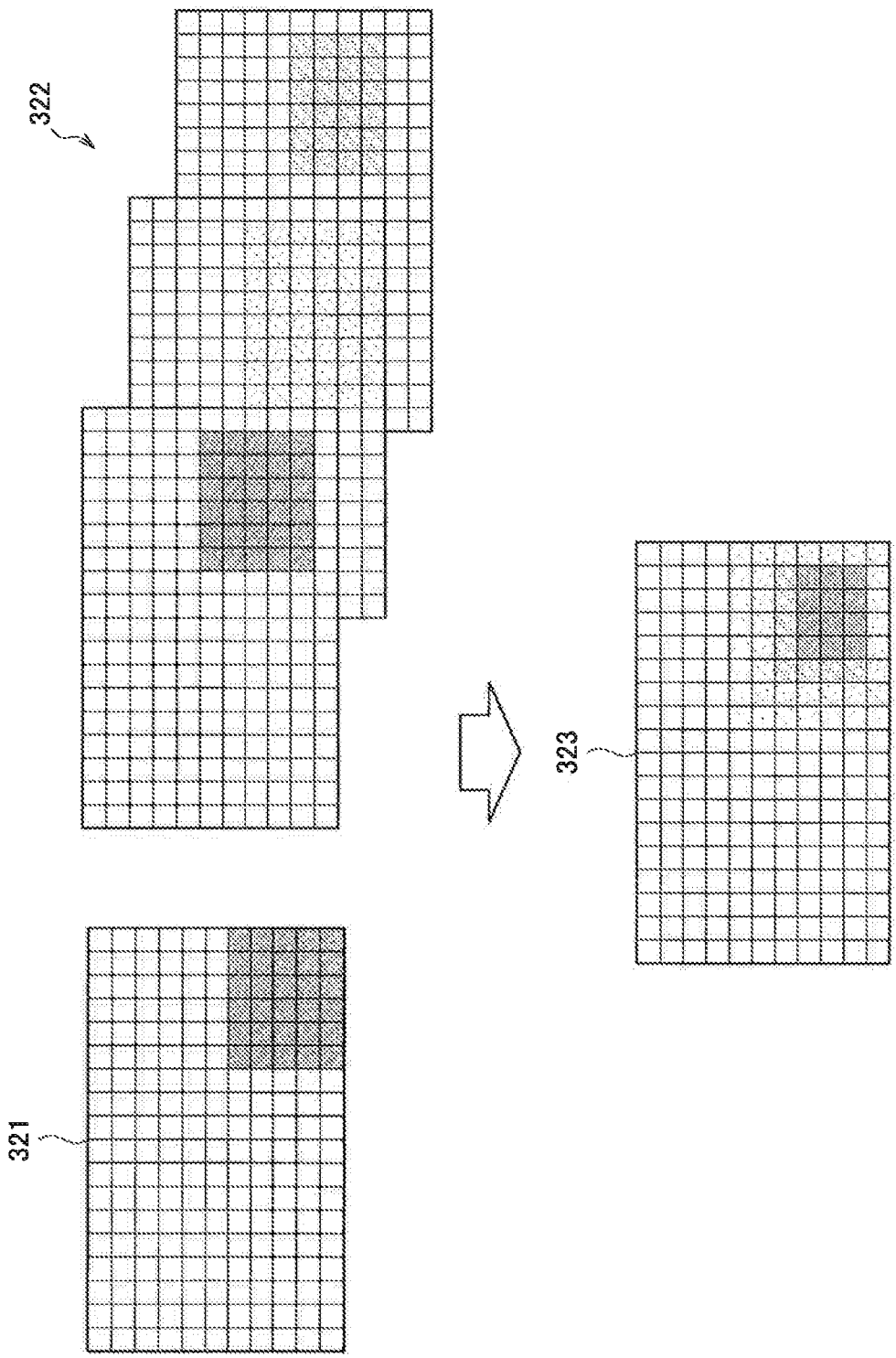

[Fig. 13]
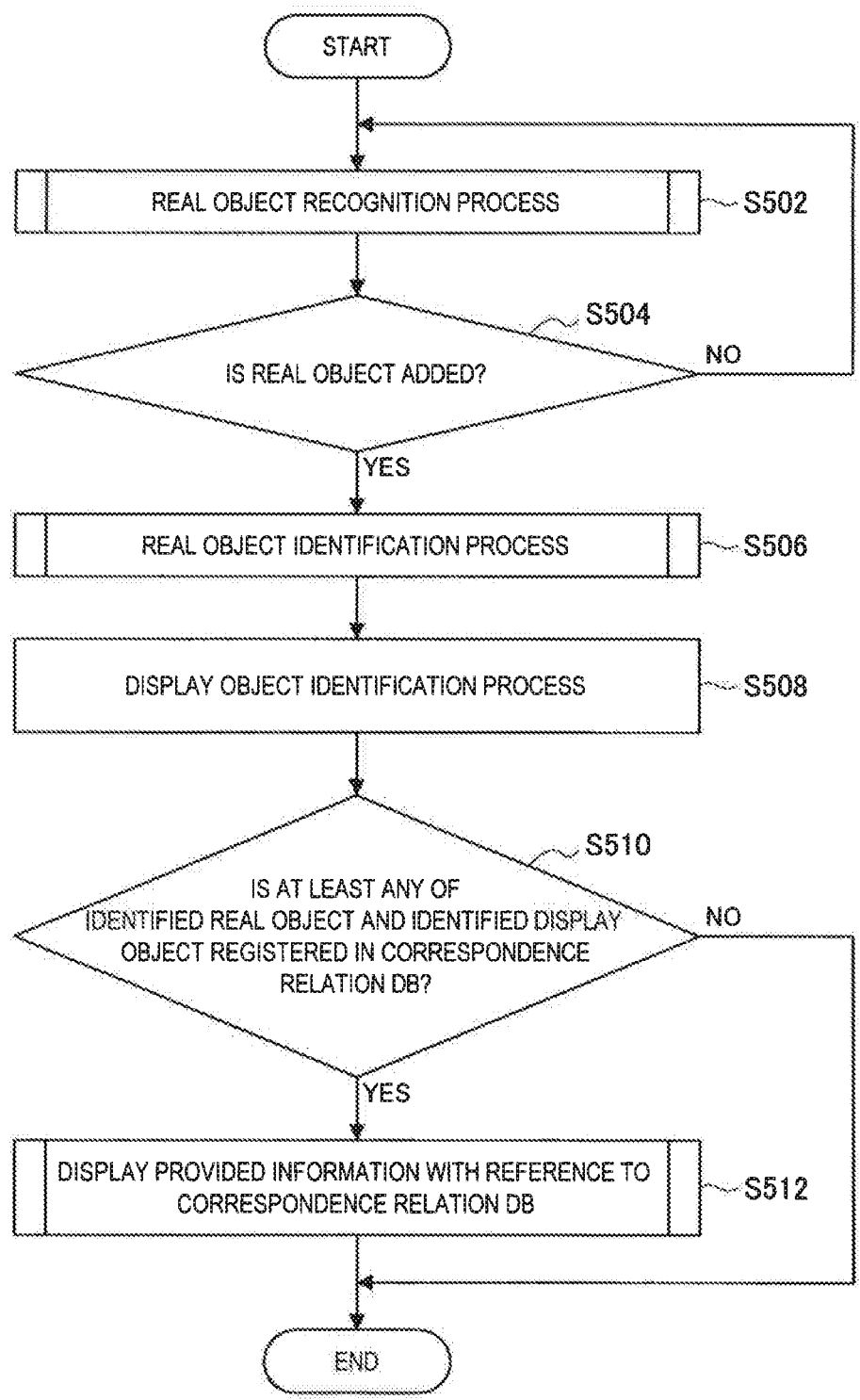

[Fig. 14]
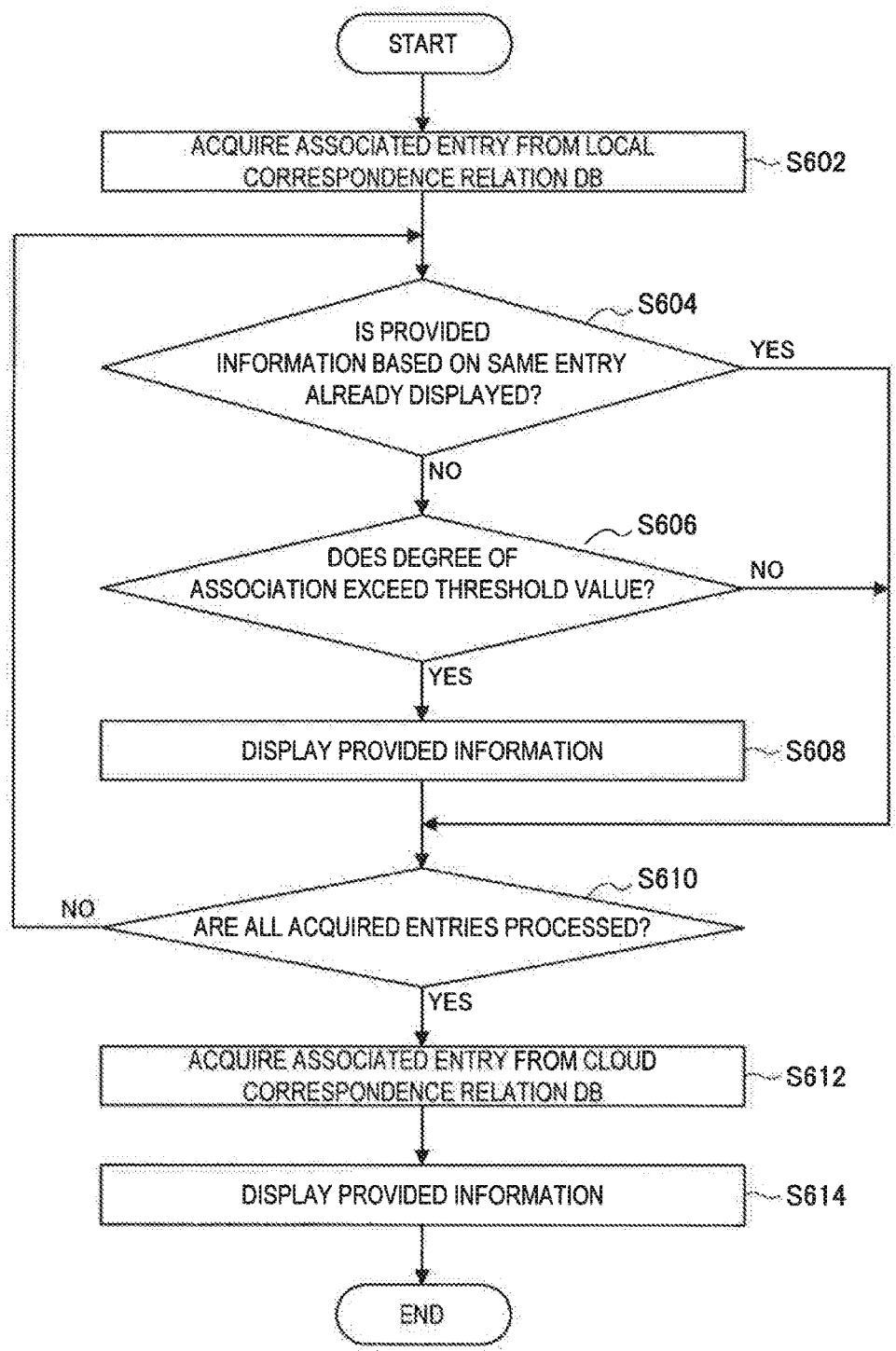

[Fig. 15]

| IDENTIFICATION INFORMATION | CONTENT OF DISPLAY OBJECT | IDENTIFICATION INFORMATION | CONTENT OF DISPLAY OBJECT |
|---|---|---|---|
| D1 | | D5 | |
| D2 | | D6 | |
| D3 | | D7 | |
| D4 | | D8 | |

[Fig. 16]

| IDENTIFICATION INFORMATION | IMAGE INFORMATION | 3D SHAPE INFORMATION | POSITION MAP | TIME PERIOD |
|---|---|---|---|---|
| R1 | | | | DAYTIME |
| R2 | | | | DAYTIME |
| R3 | | | | MORNING |
| R4 | | | | MORNING |

HEIGHT: HIGH / LOW

[Fig. 17]

[Fig. 18]
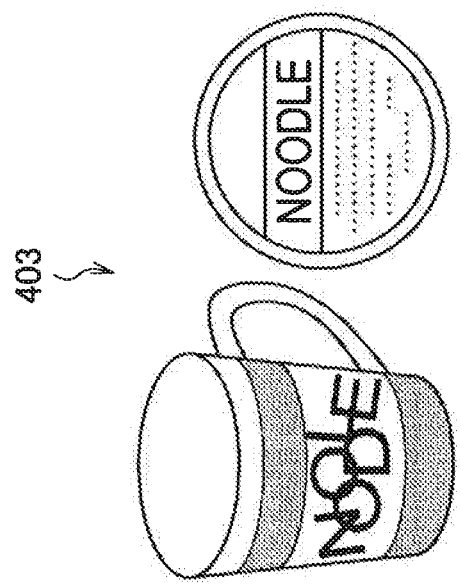
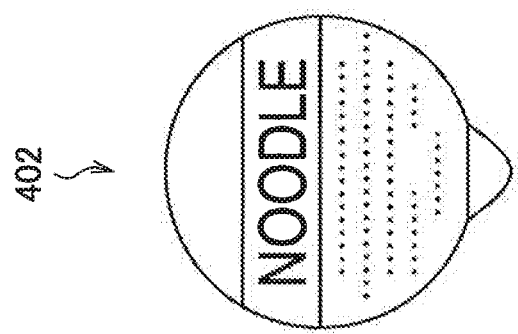
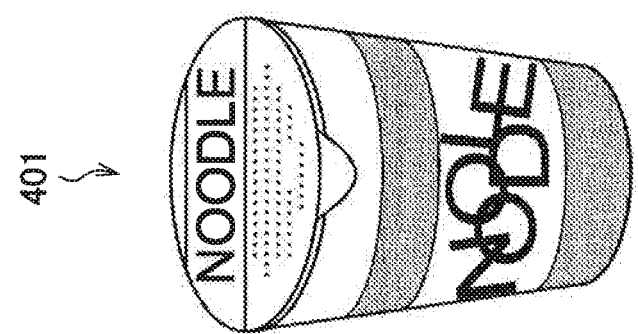

[Fig. 19]
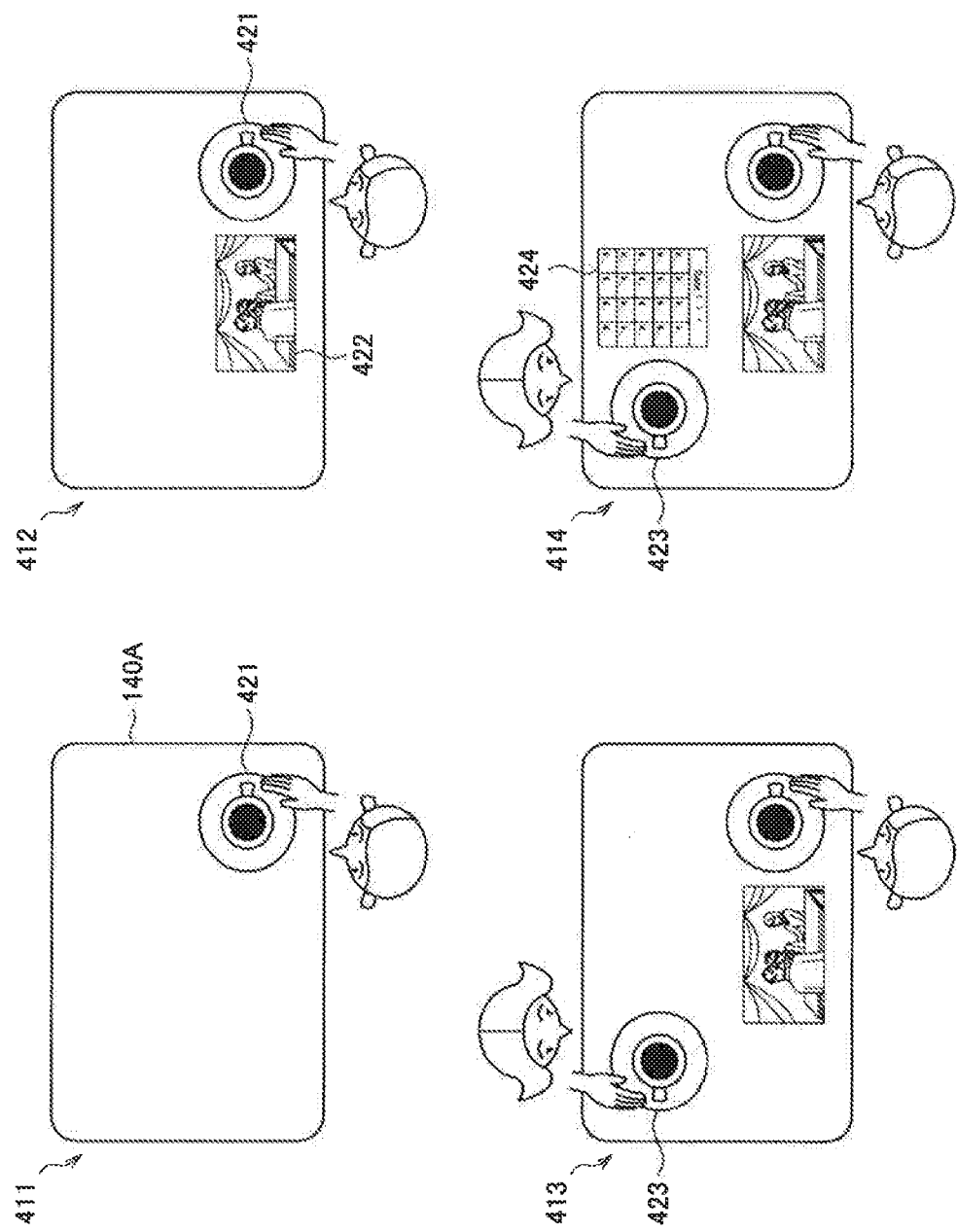

[Fig. 20]
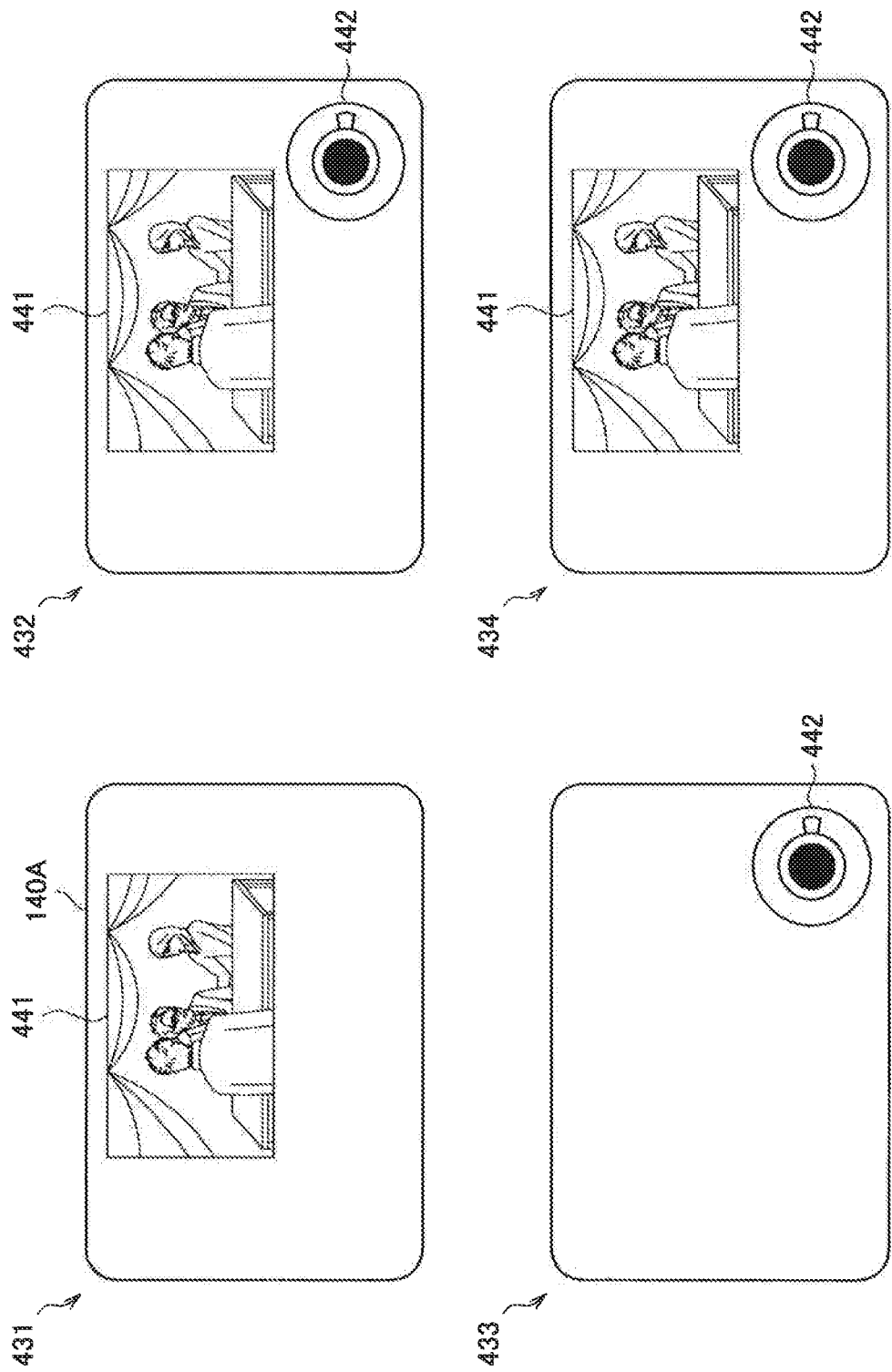

[Fig. 21]
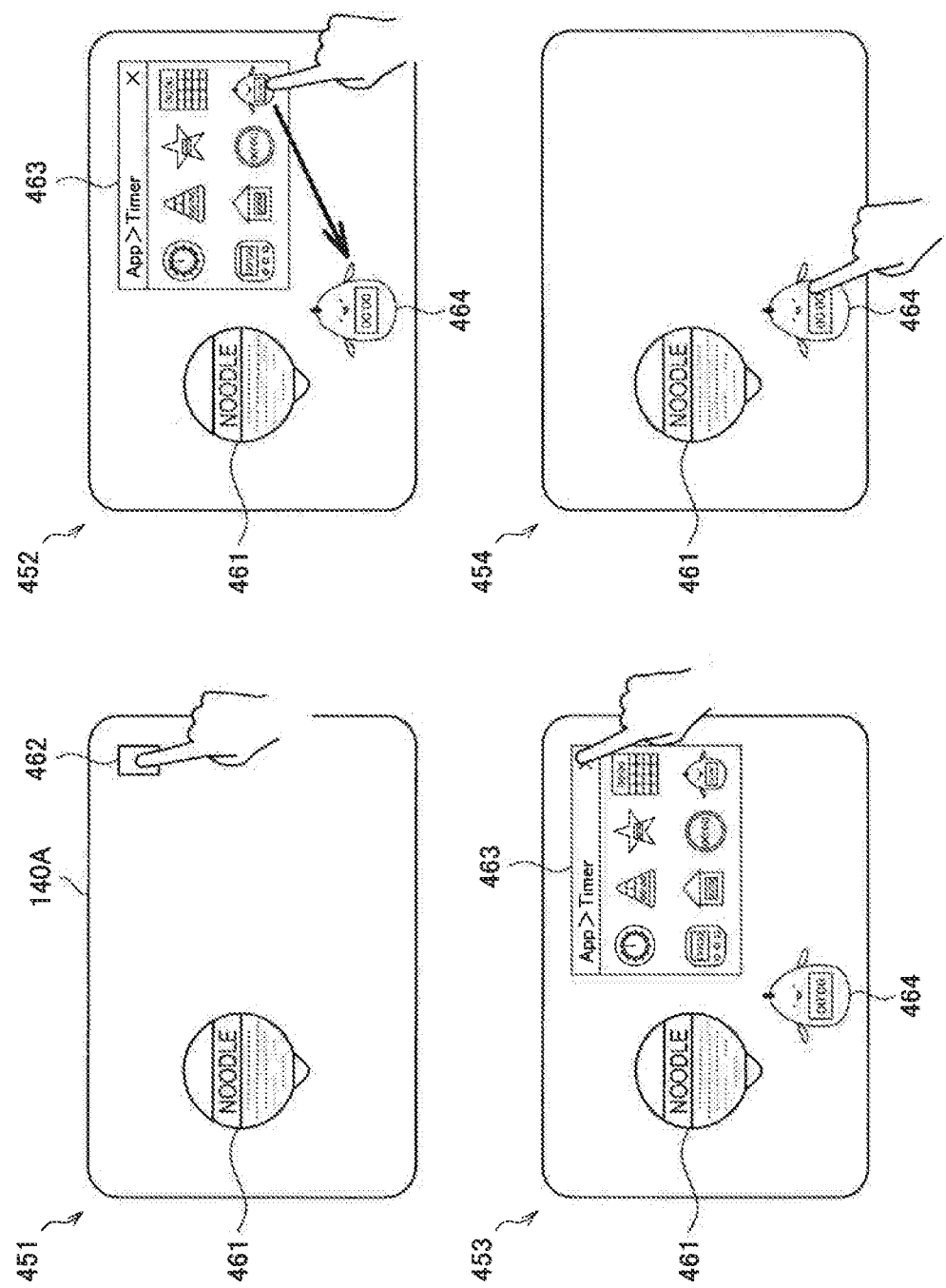

[Fig. 22]
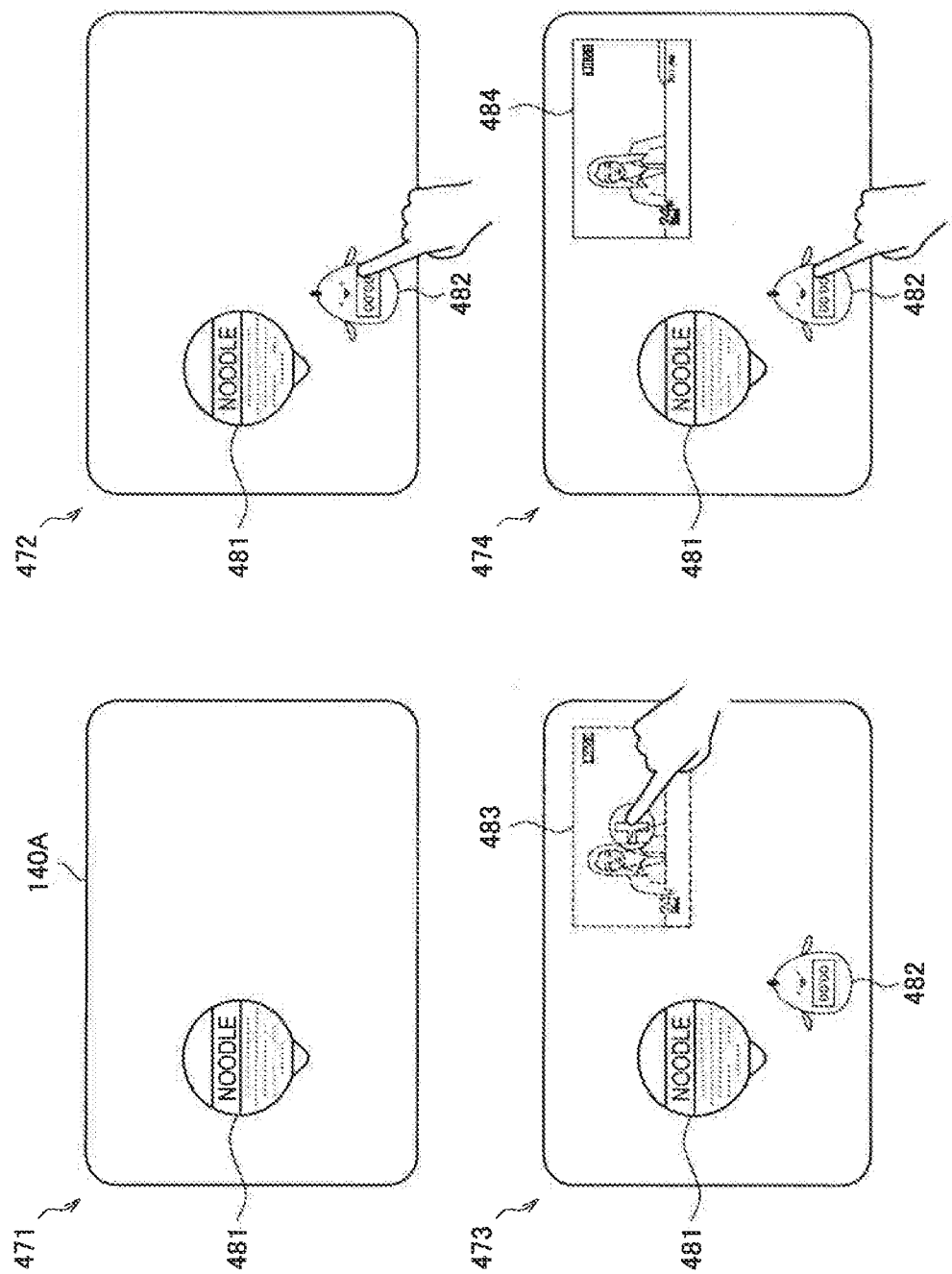

[Fig. 23]
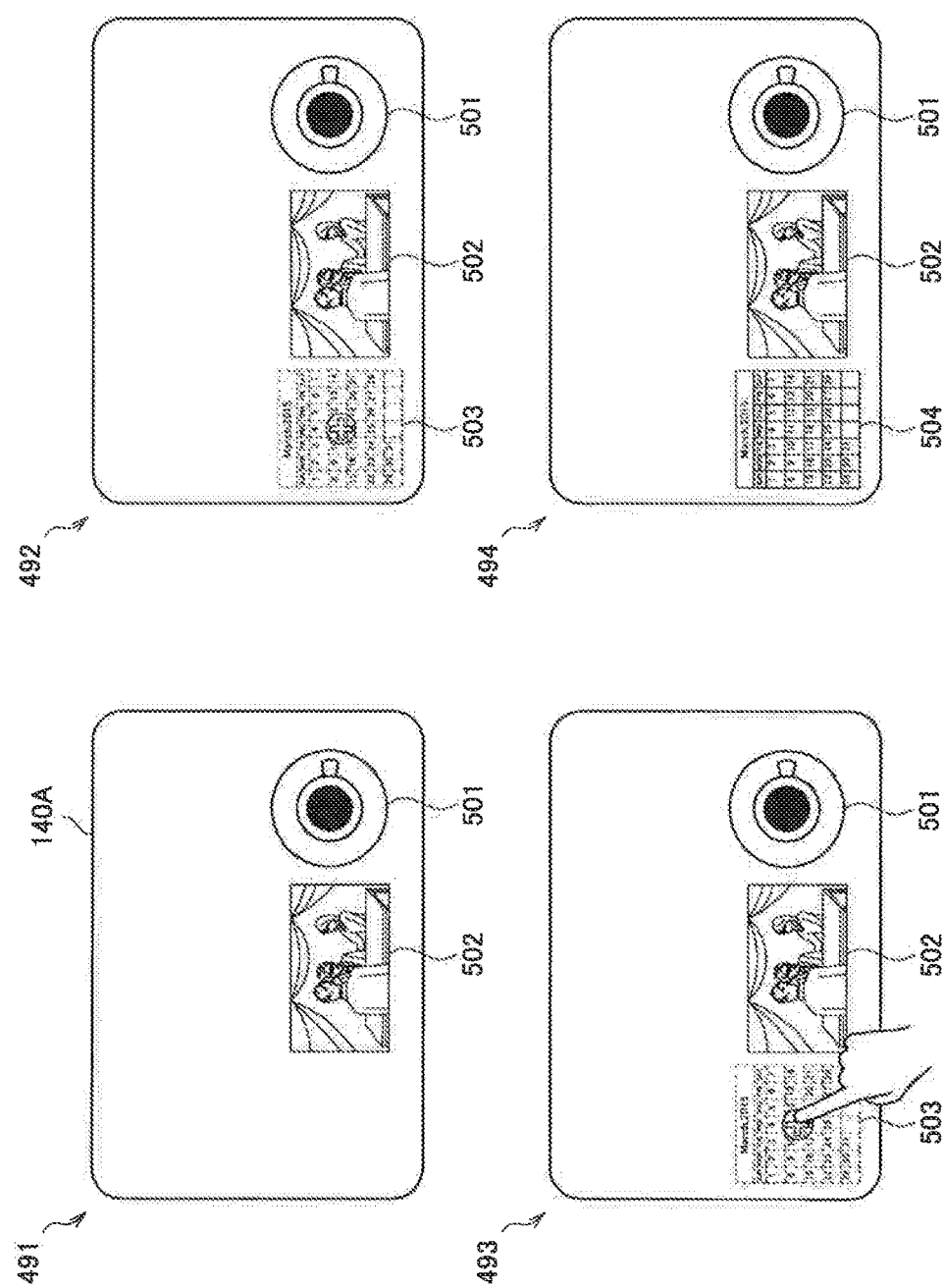

[Fig. 24]
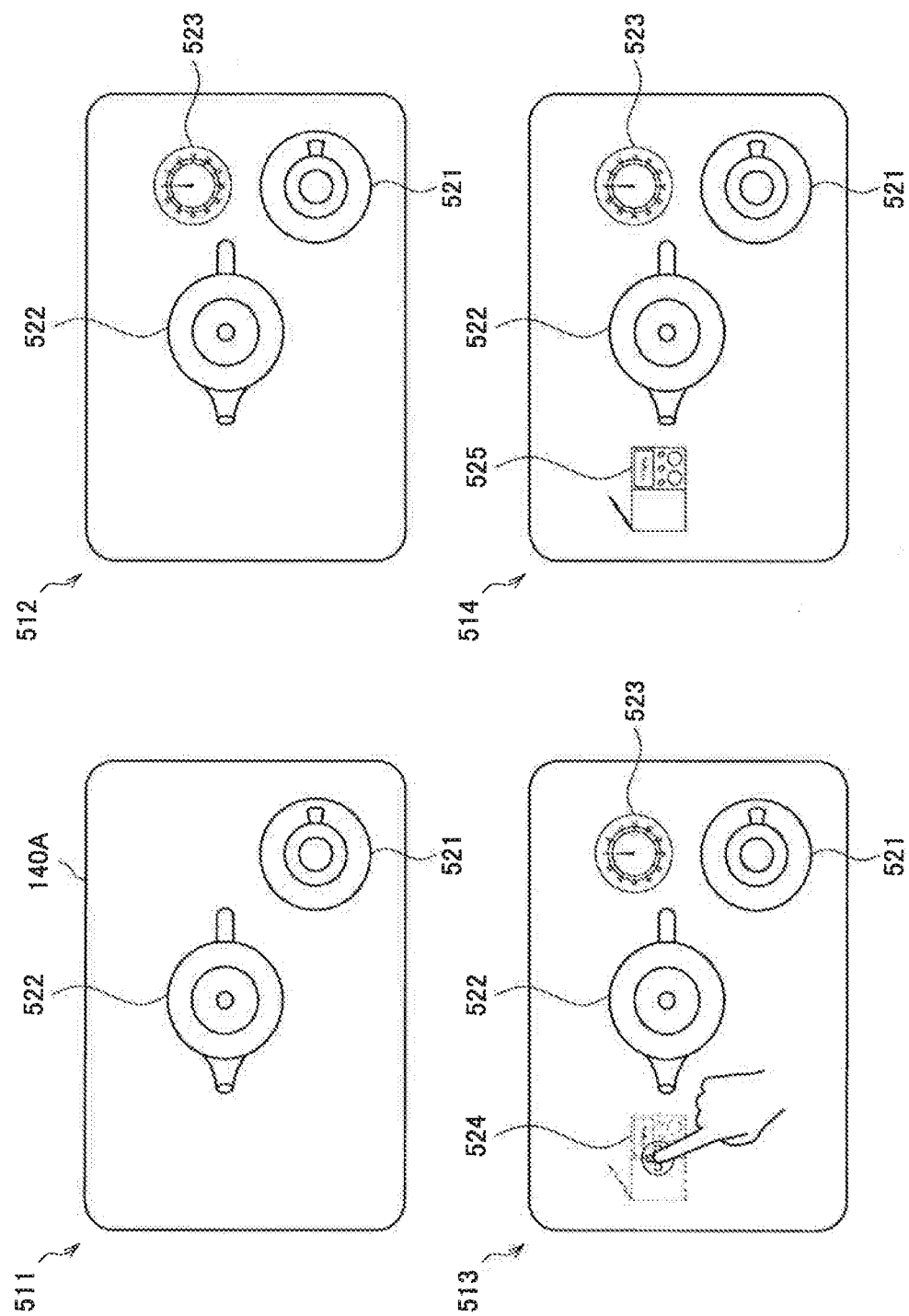

[Fig. 25]
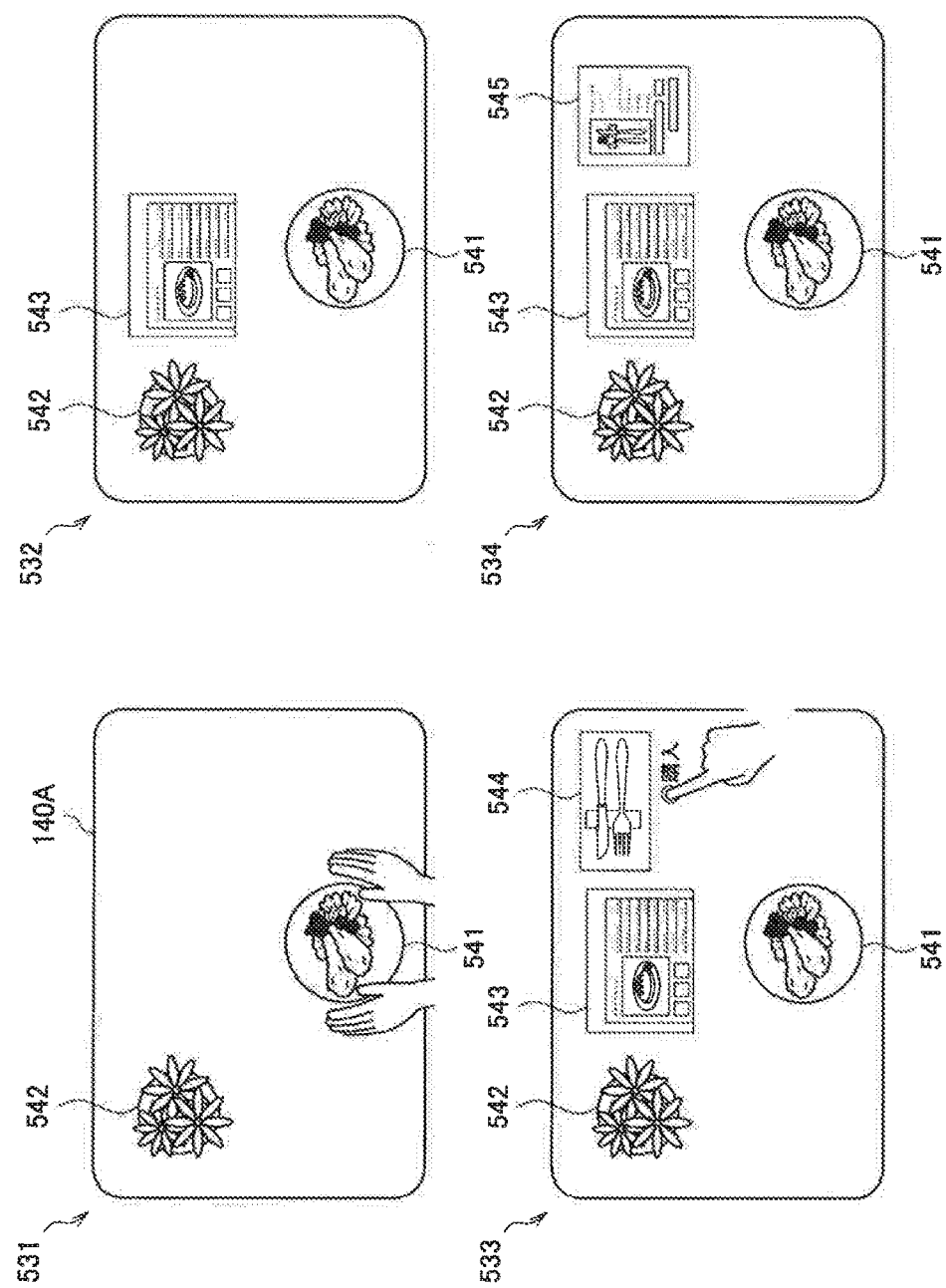

[Fig. 26]
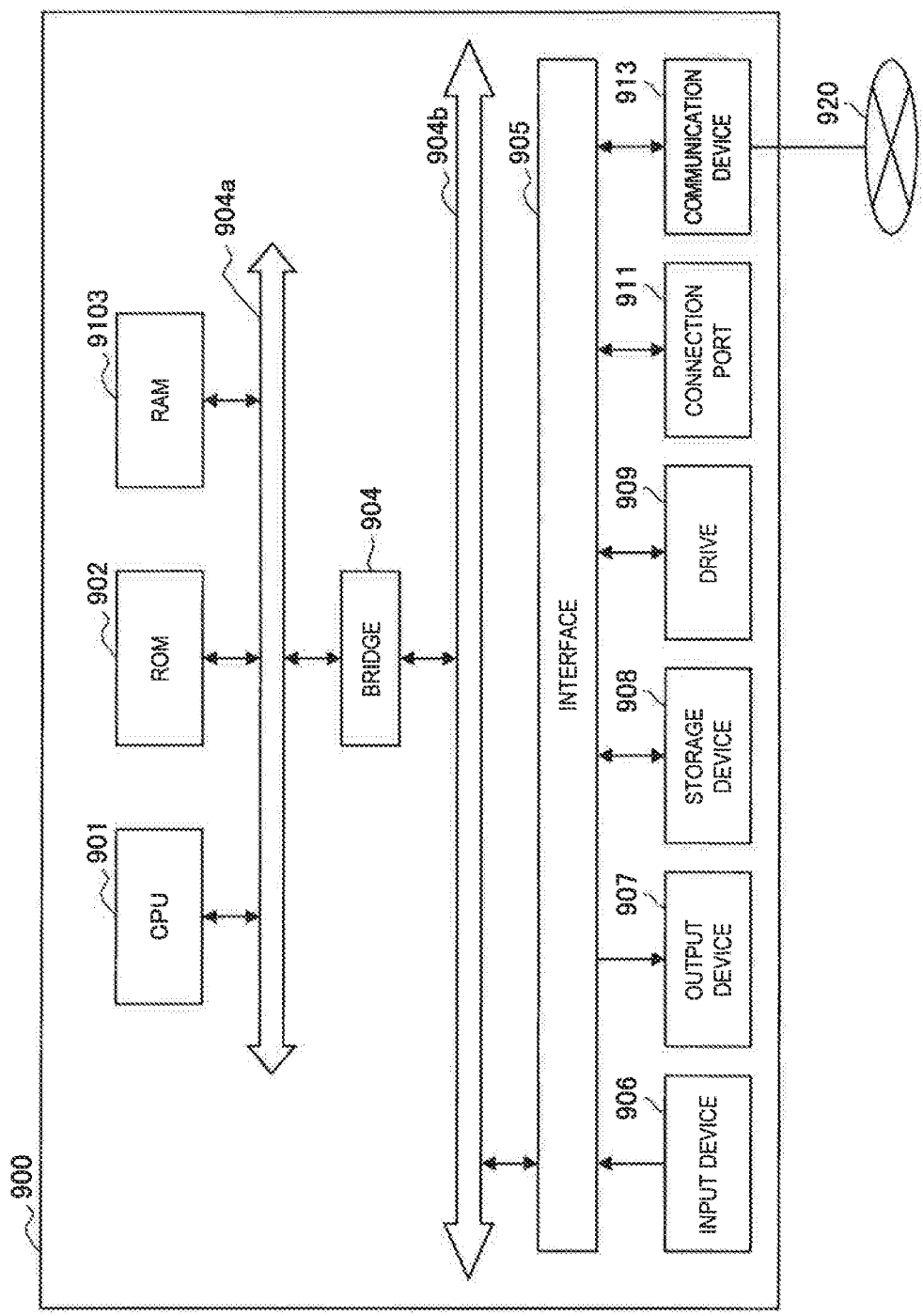

INFORMATION PROCESSING SYSTEM, INFORMATION PROCESSING METHOD AND PROGRAM

CROSS REFERENCE TO RELATED APPLICATIONS

This application is a National Stage Patent Application of PCT International Patent Application No. PCT/JP2016/000952 filed Feb. 23, 2016 under 35 U.S.C. § 371, which claims the benefit of Japanese Priority Patent Application JP 2015-073833 filed Mar. 31, 2015, the entire contents of which are incorporated herein by reference.

TECHNICAL FIELD

The present disclosure relates to an information processing system, an information processing method and a program.

BACKGROUND ART

Devices configured to display various pieces of information according to a manipulation with respect to a touch panel of a smartphone or a tablet terminal are widespread. In tablet terminals, implementation of a large screen size and a method of a plurality of users simultaneously performing manipulations are considered. In addition, projectors have been used as devices configured to display information since the past.

With the proliferation of such devices configured to display information, various user interfaces for enabling various manipulations with respect to displayed information have been proposed. For example, in the following Patent Literature 1, a technique for reading corresponding information such as a URL with reference to a database using an image captured by a mobile terminal as a key is disclosed.

CITATION LIST

Patent Literature

[PTL 1]
JP 2006-48672A

SUMMARY

Technical Problem

A surrounding environment of a device when information is displayed or a state of displayed information is not always constant. For example, various real objects may be near the device and various display objects may be displayed. In view of the above situations, there is a need to display information appropriately and efficiently according to the real object or the display object, and increase user convenience.

Accordingly, the present disclosure proposes a novel and improved information processing system, information processing method and program through which it is possible to increase user convenience.

Solution to Problem

According to an aspect of the present disclosure, there is provided an information processing apparatus including: circuitry configured to control output of a first content according to first content information, determine information related to a real object which is different from a manipulation body used for content selection or object manipulation by a user, and control output of a second content, which is different from the first content, according to second content information, wherein the second content information is based on the first content information and the determined information related to the real object.

According to another aspect of the present disclosure, there is provided an information processing method including: outputting a first content according to first content information, determining information related to a real object which is different from a manipulation body used for content selection or object manipulation by a user, and outputting a second content, which is different from the first content, according to second content information, wherein the second content information is based on the first content information and the determined information related to the real object.

According to another aspect of the present disclosure, there is provided a non-transitory computer-readable medium having embodied thereon a program, which when executed by a computer causes the computer to execute a method, the method including: outputting a first content according to first content information, determining information related to a real object which is different from a manipulation body used for content selection or object manipulation by a user, and outputting a second content, which is different from the first content, according to second content information, wherein the second content information is based on the first content information and the determined information related to the real object.

Advantageous Effects of Invention

According to an embodiment of the present disclosure described above, it is possible to increase user convenience. Note that the above advantageous effects are not strictly limiting, and that any advantageous effect indicated in the present disclosure or another advantageous effect that may be reasoned from the present disclosure may also be exhibited in addition to, or instead of, the above advantageous effects.

BRIEF DESCRIPTION OF DRAWINGS

FIG. 1 is a diagram illustrating an exterior configuration example of an information processing system according to an embodiment.

FIG. 2 is a diagram illustrating an exterior configuration example of an information processing system according to an embodiment.

FIG. 3 is a diagram illustrating an exterior configuration example of an information processing system according to an embodiment.

FIG. 4 is a block diagram illustrating an exemplary logical configuration of an information processing system according to an embodiment.

FIG. 5 is a block diagram illustrating an exemplary logical configuration of an information processing system according to an embodiment.

FIG. 6 a flowchart illustrating an exemplary flow of correspondence relation DB update processes performed in an information processing system according to an embodiment.

FIG. 7 is a flowchart illustrating an exemplary flow of real object recognition processes performed in an information processing system according to an embodiment.

FIG. 8 is a flowchart illustrating an exemplary flow of real object identification processes performed in an information processing system according to an embodiment.

FIG. 9 is a diagram for describing an exemplary process of acquiring a position map according to an embodiment.

FIG. 10 is a diagram for describing an exemplary process of computing a concordance rate of a position map according to an embodiment.

FIG. 11 is a flowchart illustrating an exemplary flow of real object DB update processes performed in an information processing system according to an embodiment.

FIG. 12 is a diagram for describing an exemplary process of updating a position map in a real object DB according to an embodiment.

FIG. 13 is a flowchart illustrating an exemplary flow of provided information display processes performed in an information processing system according to an embodiment.

FIG. 14 is a flowchart illustrating an exemplary flow of provided information display processes performed in an information processing system according to an embodiment.

FIG. 15 is a diagram illustrating exemplary information stored in a display object DB according to an embodiment.

FIG. 16 is a diagram illustrating exemplary information stored in a real object DB according to an embodiment.

FIG. 17 is a diagram illustrating exemplary information stored in a real object DB according to an embodiment.

FIG. 18 is a diagram for describing an exemplary process of identifying a real object according to an embodiment.

FIG. 19 is a diagram for describing an exemplary process of identifying a real object according to an embodiment.

FIG. 20 is a diagram for describing an exemplary process of a local correspondence relation DB according to an embodiment.

FIG. 21 is a diagram for describing an exemplary process of a local correspondence relation DB according to an embodiment.

FIG. 22 is a diagram for describing an exemplary process of a cloud correspondence relation DB according to an embodiment.

FIG. 23 is a diagram for describing an exemplary process of a cloud correspondence relation DB according to an embodiment.

FIG. 24 is a diagram for describing an exemplary process of a cloud correspondence relation DB according to an embodiment.

FIG. 25 is a diagram for describing an exemplary process of a cloud correspondence relation DB according to an embodiment.

FIG. 26 is a block diagram illustrating an exemplary hardware configuration of an information processing device according to an embodiment.

DESCRIPTION OF EMBODIMENTS

Hereinafter, embodiments of the present disclosure will be described in detail and with reference to the attached drawings. Note that, in this specification and the appended drawings, structural elements that have substantially the same function and structure are denoted with the same reference numerals, and repeated explanation of these structural elements is omitted.

Also, in this specification and the appended drawings, elements having substantially the same function and structure may in some cases be distinguished by different letters appended to the same sign. For example, multiple elements having substantially the same function and structure are distinguished as information processing systems 100A, 100B, 100C, and so on as appropriate. On the other hand, when not particularly distinguishing each of multiple elements having substantially the same function and structure, only the same sign will be given. For example, the information processing systems 100A, 100B and 100C will be simply designated the information processing system 100 when not being particularly distinguished.

The description will proceed in the following order.
1. Configuration example
1.1. Exterior configuration example
1.2. Functional configuration example
2. Function details
2.1. DB update function
2.2. Provided information display function
3. Specific examples
4. Hardware configuration example
5. Summary

1. CONFIGURATION EXAMPLE

<1.1. Exterior Configuration Example>

First, an exterior configuration of the information processing system 100 according to an embodiment of the present disclosure will be described.

FIG. 1 is a diagram illustrating an exterior configuration example of the information processing system 100A according to an embodiment. As illustrated in FIG. 1, the information processing system 100A according to an embodiment includes an input unit 110A and an output unit 130A. The information processing system 100A illustrated in FIG. 1 is a system that displays information on a top surface of a table 140A and enables a user who uses the information processing system 100A to manipulate the information displayed on the table 140A. A method of displaying information on the top surface of the table 140A as illustrated in FIG. 1 is referred to as a "projection type."

The input unit 110A is a device configured to input manipulation content of the user who uses the information processing system 100A or a shape or a pattern of an object placed on the table 140A. In the example illustrated in FIG. 1, the input unit 110A is provided above the table 140A and is suspended from, for example, the ceiling. That is, the input unit 110A is provided separately from the table 140A serving as a target on which information is displayed. As the input unit 110A, for example, a camera configured to image the table 140A with one lens or a stereo camera capable of imaging the table 140A with two lenses and recording depth direction information (depth information) may be used.

When the camera configured to image the table 140A with one lens is used as the input unit 110A, if the information processing system 100A analyzes an image captured by the camera, it is possible to recognize the object placed on the table 140A. In addition, when the stereo camera is used as the input unit 110A, the input unit 110A can acquire depth information. When the input unit 110A acquires the depth information, the information processing system 100A can recognize, for example, a hand or the object placed on the table 140A. In addition, when the input unit 110A acquires the depth information, the information processing system 100A can recognize contact, approach or release between the user's hand and the table 140A. Note that, in the following description, a case in which the user brings a manipulation body such as a hand in contact with or close to a display surface of information is simply referred to in general as "contact." In this manner, the input unit 110A functions as an image sensor configured to image the table 140A, a depth sensor configured to acquire depth information on the table 140A and a touch sensor configured to recognize contact on the table 140A.

Hereinafter, a case in which the user's manipulation is recognized from an image captured by the input unit 110A will be mainly described, but the present disclosure is not limited thereto. The user's manipulation may also be recognized by a touch panel configured to recognize contact of the user's finger or the like. Also, the user's manipulation that the input unit 110A can acquire may include, for example, a stylus manipulation with respect to the display surface of information and a gesture manipulation with respect to a camera, in addition thereto.

The output unit 130A is a device that displays information on the table 140A and outputs audio according to manipulation content of the user who uses the information processing system 100A, which is input by the input unit 110A, content of information output from the output unit 130A, and information of a shape, a pattern or the like of the object placed on the table 140A. As the output unit 130A, for example, a projector or a speaker is used. In the example illustrated in FIG. 1, the output unit 130A is provided above the table 140A and is suspended from, for example, the ceiling. When the output unit 130A is formed by the projector, the output unit 130A projects information on the top surface of the table 140A.

The user who uses the information processing system 100A can place a finger or the like on the table 140A and perform a manipulation with respect to information on the table 140A displayed by the output unit 130A. In addition, when the object is placed on the table 140A and recognized by the input unit 110A, the user who uses the information processing system 100A can perform various manipulations for the recognized object.

Also, although not illustrated in FIG. 1, other devices may be connected to the information processing system 100A. For example, a lighting device for illuminating the table 140A may be connected to the information processing system 100A. When the lighting device for illuminating the table 140A is connected to the information processing system 100A, the information processing system 100A can control a lighting state of the lighting device according to a state of the display surface of information.

A mode of the information processing system 100 according to an embodiment of the present disclosure is not limited to the illustration in FIG. 1. Hereinafter, other modes of the information processing system 100 according to an embodiment will be exemplified with reference to FIGS. 2 and 3.

FIG. 2 is a diagram illustrating an exterior configuration example of the information processing system 100B according to an embodiment. In the information processing system 100B illustrated in FIG. 2, a touch panel type display is formed on a top surface of a table 140B. In the present configuration example, the output unit 130B may be formed by the touch panel type display. That is, in the present configuration example, the display surface of information is the touch panel type display. A method of displaying information on the touch panel provided on the top surface of the table 140B as illustrated in FIG. 2 is also referred to as a "touch panel type." As illustrated in FIG. 2, the input unit 110B may be formed by the touch panel type display or may be provided above the table 140B and separated from the table 140B. For example, the input unit 110B formed by the touch panel type display serves as the touch sensor, and the input unit 110B provided above the table 140B serves as the image sensor and the depth sensor.

FIG. 3 is a diagram illustrating an exterior configuration example of the information processing system 100C according to an embodiment. The information processing system 100C illustrated in FIG. 3 is formed such that information is projected to the output unit 130C from below a table 140C, and thus the information is displayed on a surface of the table 140C. That is, in the information processing system 100C illustrated in FIG. 3, the display surface of information is a top surface of the table 140C. A surface of the table 140C is formed of a transparent or semitransparent material such as a glass plate or a transparent plastic plate. A method in which information is projected to the output unit 130C from below the table 140C and thus the information is displayed on the top surface of the table 140C as illustrated in FIG. 3 is also referred to as a "rear projection type." As illustrated in FIG. 3, an input unit 110C may be provided above the table 140C and separated from the table 140C, or may be provided below the table 140C and separated from the table 140C. For example, the input unit 110C provided above the table 140C serves as the image sensor and the depth sensor, and the input unit 110C provided below the table 140C serves as the touch sensor.

In the following description, the projection type information processing system 100 illustrated in FIG. 1 will be exemplified. In addition, information displayed by the output unit 130 such as an application window, an image or a video is also referred to as "a display object." Hereinafter, the display object will be described as the application window. In addition, the object which is placed on or held over the top surface of the table 140A near the information processing system 100 is also referred to as "a real object." The user's body may also be regarded as the real object. The display object may be displayed on various object surfaces. For example, the display object may be projected on the top surface of the table 140A, or may be projected on the real object such as a screen placed on the table 140A. In this specification, the object surface on which the display object is displayed is also simply referred to as a "display surface."

<1.2. Functional Configuration Example>

Next, a functional configuration of the information processing system 100 according to an embodiment will be described.

FIG. 4 is a block diagram illustrating an exemplary logical configuration of the information processing system 100 according to an embodiment. As illustrated in FIG. 4, the information processing system 100 according to an embodiment includes the input unit 110, a control unit 120, the output unit 130 and a storage unit 150.

(1) Input Unit 110

The input unit 110 has a function of receiving an input of various pieces of information to the input unit 110. For example, the input unit 110 functions as the image sensor configured to image the table 140A, the depth sensor configured to acquire depth information on the table 140A and the touch sensor configured to recognize contact on the table 140A as described above. A range in which information is displayed by the output unit 130 and a range in which the input unit 110 receives an input of information may be the same or different. For example, the input unit 110 may acquire image data, depth information, or contact information from a wider range than the range displayed by the output unit 130.

As the image sensor, the input unit 110 may be formed by, for example, a visible light camera or an infrared camera. As the depth sensor, the input unit 110 may be formed by, for example, a stereo camera, a distance measuring sensor using a time of flight method, or a distance measuring sensor using a structured light method. As the touch sensor, the input unit 110 may also be formed by a touch panel, or may recognize contact according to depth information.

In addition, the input unit 110 may be formed by a biometric sensor configured to acquire biometric information such as a body temperature, perspiration, or a pulse of the user.

(2) Control Unit 120

The control unit 120 serves as an arithmetic processing unit and a control device, and controls overall operations in the information processing system 100 according to various programs. For example, the control unit 120 uses information input by the input unit 110 and generates information to be output from the output unit 130. As illustrated in FIG. 4, the control unit 120 serves as a recognition unit 122, a storage control unit 124 and a display control unit 126.

(2.1) Recognition Unit 122

The recognition unit 122 has a function of recognizing the real object near the information processing system 100. For example, the recognition unit 122 recognizes the display object and the real object on the object (for example, the table 140A illustrated in FIG. 1) surface on which the display object is displayed. For example, the recognition unit 122 may refer to information output by the output unit 130 and recognize the display object that is displayed on the display surface. In addition, the recognition unit 122 may recognize a shape, a pattern or the like of the real object based on image information and depth information input by the input unit 110. In addition, the recognition unit 122 may recognize the user's biometric information based on a sensing result input by the input unit 110. In addition, the recognition unit 122 may recognize a nearby device such as a wristwatch worn by the user or a gripped smartphone based on image information and depth information input by the input unit 110.

Also, when the information processing system 100 has the projection type illustrated in FIG. 1, coordinates of the display surface of information and coordinates of the manipulation body such as the user's hand in contact with the display surface are calibrated in advance to match. Therefore, the recognition unit 122 can recognize that the manipulation body such as the user's hand comes in contact with a part of the GUI.

(2.2) Storage Control Unit 124

The storage control unit 124 has a function of accessing the storage unit 150 and acquiring and storing information.

For example, the storage control unit 124 may cause information associated with a combination of the display object and the real object recognized by the recognition unit 122 to be stored in the storage unit 150. Therefore, at least one display object displayed on the display surface and at least one real object on the display surface which are recognized at the same timing are associated. Hereinafter, information indicating such a correspondence relation is also referred to as "correspondence relation information." In addition, the storage control unit 124 may acquire the correspondence relation information between the display object and the real object from the storage unit 150. Therefore, the storage control unit 124 can acquire information indicating a combination of the display object and the real object which were previously recognized at the same timing.

The storage unit 150 is a unit configured to record data in a predetermined recording medium and reproduce the data. The storage unit 150 may store a display object DB (database), a real object DB, and a correspondence relation DB, which will be described below. The storage unit 150 may store specific information in the information processing system 100, or may store information shared with another information processing system 100. For example, the storage unit 150 may be provided in the information processing system 100 and may be provided as a separate device such as a server connected to a network or the like. For convenience of description, in this specification, specific information in the information processing system 100 may be described as "local" and information shared with another information processing system 100 may be described with "cloud."

The display object DB stores information on the display object. For example, the display object DB stores information shown in the following Table 1. Identification information is information for identifying the display object. The identification information may include information for uniquely identifying the display object itself and may include information indicating a category of the display object such as an "entertainment application" when the display object is, for example, a music player. Content of the display object is information indicating content of the display object such as an application type.

TABLE 1

| Identification information | Content of display object |
|---|---|
| ... | ... |

The real object DB stores information on the real object. For example, the real object DB stores information shown in the following Table 2. Identification information is information for identifying the real object. The identification information may include information for uniquely identifying the real object itself, and may include information indicating a category of the real object such as "tableware" when the real object is, for example, a coffee cup. Image information is information indicating a captured image of the real object obtained by image data acquired by the input unit 110. 3D shape information is information indicating a 3D shape of the real object, and is, for example, depth information of the real object acquired by the input unit 110. A position map is information indicating a probability of the presence of the real object in the display surface obtained by the depth information acquired by the input unit 110. Other attribute information is information indicating attributes of the real object, and may include, for example, information indicating a time period in which the real object is recognized or information indicating a temperature of the real object. Also, the information indicating a time period may be any unit such as units of minutes, hours, or days, or days may be distinguished by days of the week or as weekdays/holidays.

TABLE 2

| Identification information | Image information | 3D shape information | Position map | Other attribute information |
|---|---|---|---|---|
| — | — | — | — | — |

The correspondence relation DB stores the correspondence relation information. For example, the correspondence relation DB stores information shown in the following Table 3. Identification information of an entry is identification information of the correspondence relation information. Identification information of the display object is identification information for identifying the associated display object, and may include at least one piece of identification information. Identification information of the real object is identification information for identifying the associated real object and may include at least one piece of identification information. Arrangement information is information indicating a relative arrangement between the real object and the display object. Information indicating an arrangement includes a relative direction, distance, orientation, size or the like. A degree of association is information indicating a degree of association between the real object and the display object, and increases as, for example, a time for which the display object and the real object are simultaneously used or the number of times thereof increases. In addition, as the correspondence relation information, information indicating a time lag may be included. For example, information indicating a time lag from when the user places the real object on the table 140A until the display object is displayed or a time lag opposite thereto may be included.

TABLE 3

| Identification information of entry | Identification information of display object | Identification information of real object | Arrangement information | Degree of association |
|---|---|---|---|---|
| — | — | — | — | — |

Also, while content of the DB has been shown above in the table, it may be implemented in the form of, for example, a relational database.

(2.3) Display Control Unit 126

The display control unit 126 has a function of controlling the output unit 130 to cause information to be output.

For example, the display control unit 126 generates a display control signal for controlling display of the display object according to information input by the input unit 110. Specifically, the display control unit 126 performs drawing control of the display object or screen transition control according to a touch on each display object.

For example, the display control unit 126 may cause provided information corresponding to at least any of a recognized display object and real object to be displayed on the output unit 130 based on a recognition result by the recognition unit 122. Therefore, the user may receive, fir example, the provision of information of the real object corresponding to the display object that is displayed, and receive the provision of information of the display object corresponding to the real object placed on the table 140A. In this case, the display control unit 126 may also display the provided information based on the correspondence relation information acquired by the storage control unit 124, in this case, the user can receive the provision of information including her or his own use method of the display object and the real object in the past and content according to use methods of other users. In this manner, the user convenience may be increased.

A display form and content of the provided information may be changed according to a recognition result by the recognition unit 122. First, the display form will be described.

For example, the display control unit 126 may control an arrangement such as a position, a size and/or an orientation in which the provided information is displayed based on identification information of the recognized display object and/or real object. Specifically, in an environment in which a coffee cup (the real object) is put down and a web browser (the display object) is displayed, the display control unit 126 may employ an arrangement corresponding to the coffee cup, an arrangement corresponding to the web browser, or an arrangement corresponding to the coffee cup and the web browser. In addition, in the same environment, the display control unit 126 may employ an arrangement corresponding to a category "tableware," an arrangement corresponding to a category "entertainment applications," or an arrangement corresponding to the category "tableware" and the category "entertainment applications."

In addition, the display control unit 126 may cause the provided information to be displayed based on a position of the recognized display object and/or real object. Specifically, the display control unit 126 may control an arrangement of the provided information based on the position of the recognized display object and/or real object. Further, the display control unit 126 may control a display parameter such as brightness or contrast. Therefore, the user can receive the provision of information in the display form according to a position at which the real object is placed and/or a position at which the display object is displayed.

The display control unit 126 may control an arrangement based on various pieces of information in addition to the position of the display object and the real object. For example, the display control unit 126 may control an arrangement based on at least any piece of information shown in the following example.

Position, size and/or orientation of real object

Position, size and/or orientation of display object

Relative position and/or orientation between real object and display object

State of process of display object

Time period

User profile

According to the information exemplified above, even if the same real object and/or display object are recognized, the display control unit 126 may employ a different arrangement when an absolute position, size, and/or orientation are different. In addition, even if the same real object and/or display object are recognized, the display control unit 126 may employ a different arrangement when a relative position and/or orientation are different. In addition, even if the same display object is recognized, the display control unit 126 may employ a different arrangement according to a state of a process of the display object such as that a process is in progress or a user input is being awaited. For example, the display control unit 126 may cause the provided information to be displayed in a great scale when an application awaits a user input, and may cause the provided information to be displayed in a small scale so as not to interfere when the user input is in progress. In addition, even if the same real object and/or display object are recognized, the display control unit 126 may employ a different arrangement when a time period and/or a user profile are different.

The display form has been described above. Next, content will be described.

For example, the provided information may be generated and displayed based on identification information of the recognized display object and/or real object. Specifically, in an environment in which the coffee cup is put down and the web browser is displayed, the display control unit 126 may cause provided information corresponding to the coffee cup to be displayed, provided information corresponding to the web browser to be displayed, and provided information corresponding to the coffee cup and the web browser to be displayed. In addition, in the same environment, the display control unit 126 may cause provided information corresponding to the category "tableware" to be displayed, provided information corresponding to the category "entertainment applications" to be displayed, and provided information corresponding to the category "tableware" and the category "entertainment applications" to be displayed.

Here, an example of provided information corresponding to the display object and the real object will be described. For example, in an environment in which the coffee cup is put down and the web browser is displayed, a music player may be displayed as the provided information corresponding to the coffee cup and the web browser. In addition, in an environment in which the coffee cup is put down and a news application is displayed, a schedule application may be displayed as provided information corresponding to the coffee cup and the news application. In addition, in an environment in which a magazine is put down and the news application is displayed, an advertisement may be displayed as provided information corresponding to the magazine and the news application.

In addition, the provided information may be generated based on the position of the recognized display object and/or real object. Specifically, the correspondence relation information according to a combination of the same display object and real object is handled as different correspondence relation information when arrangement information is different. Therefore, when the position of the recognized display object and/or real object is different, in order to generate provided information, different correspondence relation information may be referred to, and different provided information may be generated. Therefore, the user can receive the provision of information corresponding to the position at which the real object is placed and/or the position at which the display object is displayed.

The provided information may be generated based on various pieces of information in addition to the position of the display object and the real object. For example, the display control unit 126 may cause the provided information to be displayed based on at least any piece of information exemplified below.

Position, size and/or orientation of real object
Position, size and/or orientation of display object
Relative position and/or orientation between real object and display object
State of process of display object
Time period
User profile According to the information exemplified above, even if the same real object and/or display object are recognized, the display control unit 126 may cause different provided information to be displayed when an absolute position, size, and/or orientation are different. In addition, even if the same real object and/or display object are recognized, the display control unit 126 may cause different provided information to be displayed when a relative position and/or orientation are different. In addition, even if the same display object is recognized, the display control unit 126 may cause different provided information to be displayed according to a state of a process of the display object. For example, the display control unit 126 may cause a music player to be displayed in order to effectively utilize a waiting time when the web browser is downloading a file, and cause a file manager to be displayed after downloading is completed. In addition, even if the same real object and/or display object are recognized, the display control unit 126 may cause different provided information to be displayed when a time period and/or a user profile are different.

The display form and content of the provided information which are changed according to the recognition result have been described above.

When a part of the combination of the correspondence relation information is recognized and the other part thereof is not recognized, the display control unit 126 may display information on the display object or the real object which is not recognized as the provided information. The provided information may also be information of the display object associated with the real object recognized by the recognition unit 122 in the correspondence relation information. For example, the display control unit 126 may also display the display object when the display object corresponding to the recognized real object is not yet displayed. Therefore, for example, when the user places only the real object on the table 140A, an application that is often used together with the real object is displayed. The provided information may also be information of the display object associated with the display object recognized by the recognition unit 122 in the correspondence relation information. For example, when the real object corresponding to the display object that is displayed is not yet recognized, the display control unit 126 may also display the display object related to the real object. Therefore, when the user activates, for example, only an application, the display object serving as a reminder of the real object which is often used together with the application is displayed.

Alternatively, the provided information may also be advertisement information of the display object or the real object. For example, the display control unit 126 may also display advertisement information associated with at least any of the display object and the real object recognized by the recognition unit 122. Therefore, the user can receive, for example, introduction of the activated application or introduction of a product and an application associated with the real object placed on the table 140A. For example, when the user places the coffee cup, chocolates or cookies may be recommended. The advertisement information may be registered in the cloud correspondence relation DB by, for example, a third party such as a company.

The display control unit 126 may also display the provided information based on the correspondence relation information obtained by the information processing system 100 itself. That is, the display control unit 126 may also display the provided information with reference to a local correspondence relation DB. Therefore, the user can receive the provision of information according to her or his own use method. Alternatively, the display control unit 126 may also display the provided information based on the correspondence relation information in another information processing system 100. That is, the display control unit 126 may also display the provided information with reference to the cloud correspondence relation DB. Therefore, the user can receive the provision of information based on integrated knowledge including other users who use the same use method as the user. In addition, for example, when the information processing system 100 is installed in each different room in one house, in consideration of a case in which there is a difference between uses of the display object and the real object, the mutual correspondence relation DB may be referred to. Further, the display control unit 126 may also display the provided information based on the correspondence relation information of another user who is similar to the user recognized by the recognition unit 122. For example, the storage control unit 124 refers to pre-registered user profile information, determines a sex or an age group from a hand image or a voice, determines whether she or he is married based whether or not she or he is wearing a ring, or determines a race according to a color or a region of skin. Therefore, the display control unit 126 may also display the provided information based on the correspondence relation information registered in the cloud correspondence relation DB related to another user who has a similar profile to the user. Therefore, the user can receive the provision of information based on integrated knowledge related to another user who has a similar profile to the user.

The control unit 120 may be formed by, for example, a central processing unit (CPU). When the control unit 120 is formed by a device such as the CPU, such a device may be formed by an electronic circuit.

In addition, although not illustrated in FIG. 4, the control unit 120 may have a communication function of wirelessly communicating with other devices or a function of controlling operations of other devices connected to the information processing system 100, for example, the lighting device.

(3) Output Unit 130

The output unit 130 has a function of outputting information based on control according to the display control unit 126. For example, the output unit 130 serves as a display unit configured to display the display object according to a display control signal generated by the display control unit 126. The output unit 130 may be formed by, for example, a touch panel, a liquid crystal screen or a projector.

The information processing system 100 illustrated in FIG. 4 may be formed by a single device, or a part or all thereof may be formed by separate devices. For example, in the functional configuration example of the information processing system 100 illustrated in FIG. 4, the control unit 120 may be provided in a device such as a server that is connected to the input unit 110 and the output unit 130 via a network. When the control unit 120 is provided in the device such as the server, information from the input unit 110 is transmitted to the device such as the server via the network, the control unit 120 performs a process according to the information from the input unit 110, and information to be output by the output unit 130 is transmitted to the output unit 130 from the device such as the server via the network. Such a configuration example will be described below with reference to FIG. 5.

FIG. 5 is a block diagram illustrating an exemplary logical configuration of the information processing system 100 according to an embodiment. As illustrated in FIG. 5, the information processing system 100 according to an embodiment includes an input and output device 200, a server 300 and the storage unit 150.

The input and output device 200 includes a communication unit 160 and the above-described input unit 110 and output unit 130. The communication unit 160 has a function of communicating with the server 300. The communication unit 160 transmits information input by the input unit 110 to the server 300, and outputs the display control signal received from the server 300 to the output unit 130.

The server 300 includes a communication unit 170, and the above-described recognition unit 122, storage control unit 124 and display control unit 126. The communication unit 170 has a function of communicating with the input and output device 200. The communication unit 170 receives information input by the input unit 110 from the input and output device 200, and transmits the display control signal to the input and output device 200.

The functional configuration example of the information processing system 100 according to an embodiment has been described above. Next, functions of the information processing system 100 according to an embodiment will be described in detail with reference to FIGS. 6 to 14.

2. FUNCTION DETAILS

<2.1. DB Update Function>

First, the DB update function will be described. The information processing system 100 updates the correspondence relation DB, the real object DB and the display object DB as a prior preparation for displaying the provided information. Hereinafter, such an update process will be described. Note that, in the display object DB, since the display object that may be displayed is simply registered or updated in the DB, description thereof will be omitted.

(Correspondence Relation DB Update Process)

FIG. 6 is a flowchart illustrating an exemplary flow of correspondence relation DB update processes performed in the information processing system 100 according to an embodiment.

As illustrated in FIG. 6, first, in step S102, the recognition unit 122 determines whether an available display object is displayed. The recognition unit 122 determines that, for example, an application that is iconized and not used by the user is not available. In addition, the recognition unit 122 determines that, for example, an application whose time since activation is less than a predetermined time is not available. In this manner, the following process is prevented from being performed on the display object that is not used or the display object that is incorrectly displayed. When it is determined that the available display object is not displayed (NO in S102), the process returns to step S102 again.

When it is determined that the available display object is displayed (YES in S102), in step S104, the information processing system 100 performs a real object recognition process. The real object recognition process is a process for recognizing the real object. This process will be described below in detail with reference to FIG. 7. Within the available display object, using the display object on which processes of steps S106 to S122 are not performed as a target, processes after this step are performed for each target display object.

Next, in step S106, the recognition unit 122 determines whether the real object is recognized in step S104. When it is determined that the real object is not recognized (NO in S106), the process advances to the following step S124.

When it is determined that the real object is recognized (YES in S106), in step S108, the information processing system 100 performs a real object identification process. The real object identification process is a process of identifying the target real object as the real object registered in the real object DB. This process will be described below in detail with reference to FIG. 8. Within the recognized real object, using the real object on which processes of steps S108 to S120 are not performed as a target, processes after this step are performed for each target real object.

Next, in step S110, the information processing system 100 performs a real object DB update process. The real object DB update process is a process of updating the real object DB. This process will be described below in detail with reference to FIG. 11.

Next, in step S112, the storage control unit 124 determines whether the correspondence relation information of a combination of the available display object and the target real object is registered in the correspondence relation DB.

When it is determined that the information is not registered (NO in S112), in step S120, the storage control unit 124 registers an entry in the local correspondence relation DB. For example, the storage control unit 124 adds an entry of the correspondence relation information to the correspondence relation DB. In this case, the storage control unit 124 registers arrangement information based on an arrangement relation between the real object and the display object, for example, a direction, a distance, an orientation or a size of the display object seen from the real object. In addition, the storage control unit 124 sets an initial value of a degree of association. Then, the process advances to the following step S122.

When it is determined that the information is registered (YES in S112), in step S114, the storage control unit 124 updates the entry of the local correspondence relation DB. For example, the storage control unit 124 increases a degree of association of the correspondence relation information in the correspondence relation DB. Therefore, a probability of the provided information being provided based on the correspondence relation information increases. Also, when a direct manipulation with respect to the correspondence relation DB or the provided information is rejected by the user, the degree of association may decrease. Therefore, a probability of the provided information being provided based on the correspondence relation information decreases. In addition, the storage control unit 124 may update arrangement information of the entry according to the arrangement relation between the real object and the display object.

Next, in step S116, the storage control unit 124 determines whether the updated entry satisfies predetermined conditions. For example, when a degree of association exceeds a threshold value, the storage control unit 124 determines that predetermined conditions are satisfied, and otherwise, the storage control unit 124 determines that predetermined conditions are not satisfied. When it is determined that the predetermined conditions are satisfied (YES in S116), in step S118, the storage control unit 124 updates a cloud information provision DB. When the entry is not registered, the storage control unit 124 registers the entry. When the entry is registered, the storage control unit 121 updates the entry. Therefore, information of an entry having a high degree of association is shared with another information processing system 100. When it is determined that predetermined conditions are not satisfied (NO in S116), the process advances to the following step S122.

In step S122, the storage control unit 124 determines whether all target real objects are processed. When it is determined that there is an unprocessed real object (NO in S122), the process returns to step S108 again. When it is determined that the objects are processed (YES in S122), in step S124, the recognition unit 122 determines whether all available display objects are processed. When it is determined that the objects are processed (YES in S124), the process ends. Otherwise, when it is determined that there is an unprocessed display object (NO in S124), the process returns to step S104 again.

(Real Object Recognition Process)

FIG. 7 is a flowchart illustrating an exemplary flow of real object recognition processes performed in the information processing system 100 according to an embodiment.

As illustrated in FIG. 7, first, in step S202, the recognition unit 122 sets depth information of an initial state. For example, the recognition unit 122 sets depth information on the display surface at a certain time as the depth information of an initial state. The recognition unit 122 may set a state of a time at which the information processing system 100 is activated as the depth information of an initial state, or may update the depth information of an initial state whenever the real object is added or removed. The depth information of an initial state may be depth information of a state in which there is no real object on the display surface or may be depth information when any real object is on the display surface.

Next, in step S204, the recognition unit 122 acquires depth information on the display surface. Therefore, in step S206, the recognition unit 122 compares the depth information of an initial state with the acquired depth information. For example, when there is a region having a higher height than that of the depth information of an initial state in the acquired depth information, the recognition unit 122 determines that the real object is added to the region. Otherwise, when there is a region having a lower height than that of the depth information of an initial state in the acquired depth information, the recognition unit 122 determines that the real object is removed from the region.

When it is determined that the real object is added (YES in S208), in step S210, the recognition unit 122 recognizes the added real object as the target real object. According to this step, it is possible to prevent an immovable real object such as a tissue box constantly placed on the table 140A, an irregularity of the table 140A or the like from being handled as the target.

On the other hand, when it is determined that the real object is not added (NO in S208), if it is determined that the real object is removed (YES in S212), in step S214, the recognition unit 122 excludes the removed real object from a recognition target.

In this manner, the recognition unit 122 continuously monitors whether the real object is added to or removed from the display surface. Therefore, the information processing system 100 can appropriately recognize the real object that is put down or removed by the user at any time.

(Real Object Identification Process)

FIG. 8 is a flowchart illustrating an exemplary flow of real object identification processes performed in the information processing system 100 according to an embodiment.

As illustrated in FIG. 8, first, in step S302, the recognition unit 122 acquires information of the target real object. For example, the recognition unit 122 acquires a captured image, information indicating a 3D shape and information indicating a position at the display surface of the target real object. Specifically, the recognition unit 122 acquires a captured image, depth information, and a position map of the real object input by the input unit 110. Here, a method of acquiring a position map will be described with reference to FIG. 9.

FIG. 9 is a diagram for describing an exemplary process of acquiring a position map according to an embodiment. As illustrated in FIG. 9, a coffee cup 301 is placed on the top surface of the table 140A by the user. Then, the recognition unit 122 recognizes a region 302 having a height based on the depth information, and acquires a position map 303 in which a range of the region 302 in a coordinate system of the top surface of the table 140A is represented as a region in which the real object is located. In the position map 303, a presence probability is 1 in a grid in which a height is recognized and is 0 in the other grids. In FIG. 9, grids are expressed in different shades according to a level of the presence probability, and the presence probability increases as the grids darken. The coordinate system of the position map is, for example, an orthogonal coordinate system in which a top surface on the table 140A is divided into grids in units of 5 cm.

Next, in step S304, the storage control unit 124 acquires an entry of the real object DB. For example, the storage control unit 124 acquires all entries registered in the real object DB.

Then, in step S306, the storage control unit 124 identifies the real object. For example, the storage control unit 124 identifies the real object according to at least any of a captured image, information indicating a 3D shape and information indicating a position at the object surface of the real object. Specifically, the storage control unit 124 searches the real object DB for an entry (image information, 3D shape information and a position map) similar to at least any of a captured image, depth information, and a position map of the real object acquired in step S302. For example, the storage control unit 124 compares the target real object with the real object registered in the entry and calculates an evaluation value based on the following equation, and identifies the real object based on the evaluation value.

$$\text{Score} = F_i M_i + F_d M_d + F_p M_p \quad \text{(Equation 1)}$$

Here, $F_i$, $F_d$ and $F_p$ are weight coefficients whose sum is 1. The storage control unit 124 can control the weight coefficient according to an environment or settings. $M_i$ denotes a concordance rate of the captured image. The concordance rate corresponds to a similarity rate in a general object recognition technique using an image. $M_d$ denotes a concordance rate of depth information. According to $M_i$, it is possible to identify a real object having no texture and real objects having the same appearance and different heights that could not be recognized using only an image. $M_i$ may be computed in the same way as a method of computing a concordance rate of a position map, which will be described below. $M_p$ denotes a concordance rate of a position map. According to $M_p$, an image and a 3D shape match. That is, it is possible to identify a real object having the same appearance and height. Here, a method of computing $M_p$ will be described with reference to FIG. 10.

FIG. 10 is a diagram for describing an exemplary process of computing a concordance rate of a position map according to an embodiment. The reference numeral 311 indicates a position map of the real object registered in the real object DB. The reference numeral 312 indicates a position map of the real object acquired in step S302. For example, the storage control unit 124 obtains a position map 313 having an absolute value of a difference between a position map 311 and a position map 312 and computes an average of differences in respective grids of the position map 313 as the concordance rate of the position map.

As an example, an example in which the recognized real objects A to C are identified as a registered real object will be described. For example, when $M_i$, $M_d$ and $M_p$ are computed as shown in the following Table 4, evaluation values of the real objects A to C are computed as in the following equation. The storage control unit 124 may identify the real object A having the greatest evaluation value as the registered real object.

$$F_i = 0.5, F_d = 0.3, F_p = 0.2$$

$$\text{Score}_A = 0.5 \times 0.9 + 0.3 \times 0.9 + 0.2 \times 0.9 = 0.9$$

$$\text{Score}_B = 0.5 \times 0.9 + 0.3 \times 0.1 + 0.2 \times 0.8 = 0.64$$

$$\text{Score}_C = 0.5 \times 0.6 + 0.3 \times 0.2 + 0.2 \times 0.9 = 0.54 \quad \text{(Equation 2)}$$

TABLE 4

| Real object identification information | $M_i$ | $M_d$ | $M_p$ |
| --- | --- | --- | --- |
| A | 90% | 90% | 90% |
| B | 90% | 10% | 80% |
| C | 60% | 20% | 90% |

The storage control unit 124 may also identify, the real object further based on other attribute information. For example, the storage control unit 124 may identify the real object according to information indicating a time period in which the real object is recognized. Therefore, the storage control unit 124 can identify the same real object as a different real object when the time period (including a time, a day of the week, a weekday/a holiday) is different. In addition, the storage control unit 124 may identify the real object according to, for example, a temperature of the real object. Therefore, the storage control unit 124 can identify the same real object as a different real object when the temperature is different.

(Real Object DB Update Process)

FIG. 11 is a flowchart illustrating an exemplary flow of real object DB update processes performed in the information processing system 100 according to an embodiment.

As illustrated in FIG. 11, first, in step S402, the storage control unit 124 determines whether the target real object is registered in the real object DB. For example, the storage control unit 124 determines whether the target real object is identified as the real object registered in the real object DB according to the real object identification process described above with reference to FIG. 8.

When it is determined that the object is registered (YES in S402), in step S404, the storage control unit 124 updates the entry of the real object DB. For example, the storage control unit 124 updates the position map of the entry of the real object DB. Here, a method of updating the position map will be described with reference to FIG. 12.

FIG. 12 is a diagram for describing an exemplary process of updating a position map in the real object DB according to an embodiment. In FIG. 12, the reference numeral 321 indicates a position map of the real object recognized this time and the reference numeral 322 indicates position maps of the real object the past several times. The storage control unit 124 generates a position map 323 obtained by averaging such is position maps and updates the entry according to the position map 323. Also, the storage control unit 124 may update the 3D shape information or the image information in the same manner.

<2.2. Provided Information Display Function>.

Next, the provided information display function will be described. The information processing system 100 uses the correspondence relation DB, the real object DB and the display object DB updated by the DB update function and performs a provided information display process of displaying the provided information.

(Provided Information Display Process)

FIG. 13 is a flowchart illustrating an exemplary flow of provided information display processes performed in the information processing system 100 according to an embodiment.

As illustrated in FIG. 13, first, in step S502, the information processing system 100 performs the real object recognition process. This process is the same as described above with reference to FIG. 7.

Next, in step S504, the recognition unit 122 determines whether a new real object is added. When it is determined that the new real object is not added (NO in S504), the process returns to step S502 again.

When it is determined that the new real object is added (YES in S504), in step S506, the information processing system 100 performs the real object identification process of the added real object. This process is the same as described above with reference to FIG. 8. Note that the information processing system 100 may perform the real object DB update process described above with reference to FIG. 11 together.

Next, in step S508, the recognition unit 122 performs a display object identification process. The display object identification process is a process of identifying the display object that is currently displayed. For example, the recognition unit 122 acquires information of the display object displayed on the display surface based on information output by the output unit 130 and identifies the display object with reference to the display object DB.

Next, in step S510, the storage control unit 124 determines whether at least any of the real object identified in step S506 and the display object identified in step S508 is registered in the correspondence relation DB.

When it is determined that the object is not registered (NO in S510), the process ends. When it is determined that the object is registered (YES in S510), in step S512, the information processing system 100 displays the provided information with reference to the correspondence relation DB. This process will be described below in detail with reference to FIG. 14.

FIG. 14 is a flowchart illustrating an exemplary flow of provided information display processes performed in the information processing system 100 according to an embodiment.

As illustrated in FIG. 14, first, in step S602, the storage control unit 124 acquires the associated entry from the local correspondence relation DB. For example, the storage control unit 124 acquires an entry including at least any of the real object identified in step S506 and the display object identified in step S508 from the correspondence relation DB. Within the acquired entry, using the entry on which processes of steps S604 to S608 are not performed as a target, processes after this step are performed for each target entry.

Next, in step S604, it is determined whether the provided information based on the same entry is already displayed. When it is determined that the information is displayed (YES in S604), the process advances to the following step S610. When it is determined that the information is not displayed (NO in S604), in step S606, the display control unit 126 determines whether a degree of association of the target entry exceeds a threshold value.

When it is determined that a degree of association does not exceed a threshold value (NO in S606), the process advances to the following step S610. When it is determined that a degree of association exceeds a threshold value (YES in S606), in step S608, the display control unit 126 displays the provided information. For example, when a part of the combination of the correspondence relation information is recognized and the other part thereof is not recognized, the display control unit 126 may display information on the display object or the real object which is not recognized as the provided information. In this case, the display control unit 126 may also display the provided information based on arrangement information. For example, when the real object is recognized and the associated display object is not recognized, the display object is displayed in a relative direction, distance, orientation, and size using the recognized real object as a reference. Therefore, for example, when the user places only the real object on the table 140A, an application that is often used together with the real object can be activated in a mode that is often used. In addition, the display control unit 126 may display advertisement information of the display object or the real object as the provided information.

Here, the display control unit 126 may preferentially display the provided information based on the correspondence relation information of a combination having a high degree of similarity, that is, when the object has been recognized many times or for a long time by the recognition unit 122. Therefore, for example, when the user places only the real object on the table 140A, an application that is often used together with the real object can be preferentially activated. In addition, when the real object or the display object is recognized, the display control unit 126 may apply a specified time lag and display the provided information. Therefore, for example, when the user places only the real object on the table 140A, an application that is often used together with the real object can be activated in connection with a timing at which use is started.

Note that, the display control unit 126 may also display the provided information according to the user's biometric information recognized by the recognition unit 122, For example, when it is recognized that the user's body temperature is high, the display control unit 126 may display enlarged characters in order for the user who is estimated to be in an excited state. In this manner, the user can receive the provision of information according to her or his own state. In addition, the display control unit 126 may display the provided information according to a device near the user recognized by the recognition unit 122. For example, when the user does not wear a wristwatch, the display control unit 126 may display a clock application. In this manner, the user can receive the provision of information according to the device near her or him.

The process in step S608 has been described above. Hereinafter, description will return to the flowchart.

Next, in step S610, the storage control unit 124 determines whether all acquired entries are processed. When it is determined that the entries are not processed (NO in S610), the process returns to step S604. When it is determined that the entries are processed (YES in S610), in step S612, the storage control unit 124 acquires an associated entry from the cloud correspondence relation DB.

Next, in step S614, the display control unit 126 displays the provided information based on the entry acquired from the cloud correspondence relation DB. The processing content is the same as in step S608. While the local correspondence relation DB learns a use method of the user who uses the information processing system 100, the cloud correspondence relation DB refers to integrated knowledge including other users. For this reason, the display control unit 126 may automatically activate, for example, an application in step 608, or may perform, for example, display that suggests an activation of an application in a semitransparent manner in this step. Therefore, the display control unit 126 may perform activation when reception is performed within a predetermined time, or may withdraw when reception is not performed.

3. SPECIFIC EXAMPLES

Next, specific examples of functions implemented by the information processing system 100 according to an embodiment will be described.

(Specific Examples of DB)

First, specific examples of the DB stored in the storage unit 150 are shown in FIGS. 15 to 17, and Tables 5 and 6.

FIG. 15 is a diagram illustrating exemplary information stored in the display object DB according to an embodiment. As illustrated in FIG. 15, a display object of an entry D1 is a television application. A display object of an entry D2 is a news application. A display object of an entry D3 is a timer application. A display object of an entry D4 is a timer application. A display object of an entry D5 is a radio application. A display object of an entry D6 is a calendar application. A display object of an entry D7 is a leaflet application. A display object of an entry D8 is a recipe application.

FIGS. 16 and 17 are diagrams illustrating exemplary information stored in the real object DB according to an embodiment. As illustrated in FIG. 16, a real object of an entry R1 is a cup of noodles. A real object of an entry R2 is a cover of the cup of noodles. A real object of an entry R3 is a coffee cup that a husband uses in the morning. A real object of an entry R4 is a coffee cup that a wife uses in the morning. As illustrated in FIG. 17, a real object of an entry R5 is a western meal. A real object of an entry R6 is a teapot. A real object of an entry R7 is a teacup. A real object of an entry R8 is flowers. A real object of an entry R9 is cutlery. Also, in FIGS. 16 and 17, a pattern of 3D shape information indicates a height from the table 140A.

Table 5 is a table that shows exemplary information stored in the local correspondence relation DB according to an embodiment. Table 6 is a table that shows exemplary information stored in the cloud correspondence relation DB according to an embodiment. As an example, the arrangement information exemplifies a direction of the display object seen from the real object. In addition, in order to facilitate understanding, content of identification information of the display object and identification information of the real object is described in parentheses.

TABLE 5

| Identification information of entry | Identification information of display object | Identification information of real object | Arrangement information | Degree of association |
|---|---|---|---|---|
| LE1 | D3 (Timer) | R1 (Cup of noodles) | Bottom right | 20 |
| LE2 | D1 (Television) | R3 (Coffee cup that husband uses in morning) | Left | 10 |
| LE3 | D4 (Timer) | R6 (Teapot) | Right | 5 |
| LE4 | D4 (Timer) | R7 (Teacup) | Top | 8 |
| LE5 | D7 (Leaflet) | R4 (Coffee cup that wife uses in morning) | Left | 10 |
| LE6 | D8 (Recipe) | R5 (Western meal) | Top | 6 |

TABLE 6

| Identification information of entry | Identification information of display object | Identification information of real object | Arrangement information | Degree of association |
|---|---|---|---|---|
| CE1 | D2 (News) | R1 (Cup of noodles) | Right | 10 |
| CE2 | D6 (Calendar) | R3 (Coffee cup that husband uses in morning) | Left | 80 |
| CE3 | D4 (Radio) | R6 (Teapot) | Left | 10 |
| CE4 | D8 (Recipe) | R5 (Western meal) | Top | 20 |
| CE5 | D8 (Recipe) | R9 (Cutlery) | Right | 30 |

(Specific Examples in which a Real Object is Identified)

Next, specific examples in which a real object is identified will be described with reference to FIGS. 18 and 19.

FIG. 18 is a diagram for describing an exemplary process of identifying the real object according to an embodiment. A real object 401 is a cup of noodles, and is assigned the identification information R1 as illustrated in FIG. 16. A real object 402 is a cover of the cup of noodles and is assigned the identification information R2 as illustrated in FIG. 16. A real object 403 is a vessel that resembles the cup of noodles and is not registered in the real object DB.

Here, an example in which the real objects 401 to 403 are placed at a similar position on the table 140A and the real object of the entry R1 is identified is considered. The real objects A to C of the example described with reference to Equation 2 and Table 4 are replaced with the real objects 401 to 403 and the registered real object is replaced with the real object of the entry R1 for this example. As shown in Table 4, in the real objects 401 to 403, there is no difference in the concordance rate $M_i$ of the captured image due to a similar appearance, but there is a significant difference in the concordance rate $M_d$ of the depth information. For this reason, the storage control unit 124 can distinguish and identify these real objects.

FIG. 19 is a diagram for describing an exemplary process of identifying the real object according to an embodiment. FIG. 19 illustrates examples of UIs in a time period of morning.

As indicated by the reference numeral 411, first, the husband is sitting in a seat and places a coffee cup 421 on the table 140A. The coffee cup 421 is registered in the real object DB as the entry R3 as illustrated in FIG. 16, and is registered in the correspondence relation. DB associated with the television application in the entry LE2 as shown in Table 5. Therefore, the information, processing system 100 refers to the entry LE2, and activates a television application 422 to the left of the coffee cup 421 as indicated by the reference numeral 412.

Next, as indicated by the reference numeral 413, the wife is sitting in a seat and places a coffee cup 423 on the table 140A. The coffee cup 423 is registered in the real object DB as the entry R4 as illustrated in FIG. 16 and is registered in the correspondence relation DB associated with the leaflet application in the entry LE5 as shown in Table 5. Therefore, the information processing system 100 refers to the entry LE5 and activates a leaflet application 424 to the left of the coffee cup 423 as indicated by the reference numeral 414.

In this manner, even real objects having substantially the same image information and 3D shape information can be distinguished by the information processing system 100 using the position map, and can be associated with different display objects. Further, in order to display the display object at a relative position using the real object as a reference, the information processing system 100 can activate an application in front of the user's eyes, for example, when the user puts a cup of coffee down with her or his right hand.

Here, it can be understood that it is difficult for a camera configured to capture an image from above the table 140A to capture an image of a face of the user and recognize the user. However, as exemplified in FIG. 19, the information processing system 100 can practically identify the user such as the husband or the wife using the position map. In addition, when the time period is different even if the user is the same, the information processing system 100 can activate a different application when the same coffee cup is placed at the same position. In this manner, when a use method is different even if the real object is the same, the information processing system 100 can display a different display object appropriate for the use method.

(Specific Examples of Local Correspondence Relation DB)

Next, specific examples in which an entry is registered in the local correspondence relation DB will be described with reference to FIGS. 20 and 21.

FIG. 20 is a diagram for describing an exemplary process of the local correspondence relation DB according to an embodiment. An example in which the display object and the real object are initially associated will be described with reference to FIG. 20.

As indicated by the reference numeral 431, the user watches a television application 441 on the table 140A. Next, as indicated by the reference numeral 432, the user places a coffee cup 442 to the right of the television application 441. In this case, the information processing system 100 performs the correspondence relation DB update process and registers the entry LE2 shown in Table 5. Also, the television application 441 is positioned to the left of the coffee cup 442. When the state indicated by the reference numeral 432 is reproduced a plurality of times, the degree of association of the entry LE2 increments and becomes equal to or greater than the threshold value. Therefore, as indicated by the reference numeral 433, when the user places the coffee cup 442 on the table 140A, the information processing system 100 automatically activates the television application 442 to the left of the coffee cup 442, as indicated by the reference numeral 434.

FIG. 21 is a diagram tier describing an exemplary process of the local correspondence relation DB according to an embodiment. An example in which the display object and the real object are initially associated will be described with reference to FIG. 21.

As indicated by the reference numeral 451, the user places a cup of noodles 461 on the table 140A and touches a launcher 462. Therefore, as indicated by the reference numeral 452, an application list 463 is displayed, and the user drags a timer application 464 within the list to the lower right of the cup of noodles 461 and activates it. Then, the user closes the application list 463 as indicated by the reference numeral 453, and uses the timer application 464 as indicated by the reference numeral 454. In this case, the information processing system 100 performs the correspondence relation DB update process and registers the entry LE1 as shown in Table 5. Therefore, when the cup of noodles is placed, the information processing system 100 automatically activates the timer application to the lower right thereof. On the other hand, when the user activates the timer application, the information processing system 100 may display information for suggesting that the cup of noodles should be placed to the upper left thereof or advertisement information for another cup of noodles.

(Specific Examples of Cloud Correspondence Relation DB)

Next, specific examples in which provided information is displayed with reference to the cloud correspondence relation D13 will be described with reference to FIGS. 22 to 25.

FIG. 22 is a diagram for describing an exemplary process of the cloud correspondence relation DB according to an embodiment. An example in which provided information is displayed based on the cloud correspondence relation DB will be described with reference to FIG. 22.

As indicated by the reference numeral 471, the user places a cup of noodles 481 on the table 140A. Therefore, the information processing system 100 refers to the entry LE1 shown in Table and activates a timer application 482 to the lower right of the cup of noodles 481 as indicated the by reference numeral 472. Then, the information processing system 100 refers to the entry CE1 registered in the cloud correspondence relation DB shown in Table 6 and displays a semitransparent display object 483 tier suggesting activation of the news application as indicated by the reference numeral 473. As indicated by the reference numeral 473, when the user touches the semitransparent display object 483 and accepts the suggestion, the information processing system 100 displays a news application 484 as indicated by the reference numeral 474. Further, the information processing system 100 may register the correspondence relation information associated with the cup of noodles 481 and the news application 484 in the local correspondence relation DB.

FIG. 23 is a diagram for describing an exemplary process of the cloud correspondence relation DB according to an embodiment. An example in which provided information is displayed based on the cloud correspondence relation DB will be described with reference to FIG. 23.

As indicated by the reference numeral 491, the user places a coffee cup 501 on the table 140A and watches a television application 502. Then, the information processing system 100 refers to the entry CE2 registered in the cloud correspondence relation DB shown in Table 6, and displays a semitransparent display object 503 for suggesting activation of a calendar application as indicated by the reference numeral 492. As indicated by the reference numeral 493, when the user touches the semitransparent display object 503 and accepts the suggestion, the information processing system 100 displays a calendar application 504 as indicated by the reference numeral 494. Further, the information processing system 100 may register the correspondence relation information associated with the coffee cup 501 and the calendar application 504 in the local correspondence relation DB.

FIG. 24 is a diagram for describing an exemplary process of the cloud correspondence relation DB according to an embodiment. An example in which provided information is displayed based on the cloud correspondence relation DB will be described with reference to FIG. 24.

As indicated by the reference numeral 511, the user places a teacup 521 and a teapot 522 on the table 140A. Then, the information processing system 100 refers to the entries LE3 and LE4 registered in the local correspondence relation DB shown in Table 5 and activates a timer application 523 as indicated by the reference numeral 512. Therefore, the information processing system 100 refers to the entry CE3 registered in the cloud correspondence relation DB shown in Table 6 and displays the semitransparent display object 524 for suggesting activation of a radio application as indicated by the reference numeral 513. As indicated by the reference numeral 513, when the user touches the semitransparent display object 524 and accepts the suggestion, the information processing system 100 displays a radio application 525 as indicated by the reference numeral 514. Further, the information processing system 100 may register the correspondence relation information associated with the teacup 521 and/or the teapot 522 and the radio application 525 in the local correspondence relation DB.

FIG. 25 is a diagram for describing an exemplary process of the cloud correspondence relation DB according to an embodiment. An example in which provided information is displayed based on the cloud correspondence relation DR will be described with reference to FIG. 25.

As indicated by the reference numeral 531, the user places a western meal 541 on the table 140A decorated with flowers 542. Then, the information processing system 100 refers to the entry LE6 shown in Table 5 and activates a recipe application 543 as indicated by the reference numeral 532. Also, as shown in Table 6, even in the cloud correspondence relation DB, the same entry CE4 is registered. However, since the information processing system 100 has already activated the recipe application 543, suggestion information based on the entry CE4 is not displayed. On the other hand, the information processing system 100 refers to the entry CE5 registered in the cloud correspondence relation DB shown in Table 6 and displays a display object 544 of recommending the cutlery as indicated by the reference numeral 533. As indicated by the reference numeral 533, when the user becomes interested in the suggestion and touches it, the information processing system 100 activates a web browser 545 displaying a purchase site of the cutlery as indicated by the reference numeral 534.

4. HARDWARE CONFIGURATION EXAMPLE

Finally, a hardware configuration of an information processing device according to an embodiment will be described with reference to FIG. 26. FIG. 26 is a block diagram illustrating an exemplary hardware configuration of an information processing device according to an embodiment. Also, an information processing device 900 illustrated in FIG. 26 may implement, for example, the information processing system 100 illustrated in FIG. 4 and the input and output device 200 and the server 300 illustrated in FIG. 5. An information process by the information processing system 100 according to an embodiment is implemented by cooperation of software and hardware to be described below.

As illustrated in FIG. 26, the information processing device 900 includes a central processing unit (CPU) 901, a read only memory (ROM) 902, a random access memory (RAM) 903 and a host bus 904a. In addition, the information processing device 900 includes a bridge 904, an external bus 904b, an interface 905, an input device 906 an output device 907, a storage device 908, a drive 909, a connection port 911 and a communication device 913. The information processing device 900 may include a processing circuit such as a DSP or an ASIC instead of or in addition to the CPU 901.

The CPU 901 serves as an arithmetic processing unit and a control device and controls overall operations in the information processing device 900 according to various programs. In addition, the CPU 901 may be a microprocessor. The ROM 902 stores a program, a calculation parameter or the like that is used by the CPU 901. The RAM 903 temporarily stores a program that is used when the CPU 901 is executed, and a parameter that is appropriately changed in the execution. The CPU 901 may form, for example, the recognition unit 122, the storage control unit 124 and the display control unit 126 illustrated in FIGS. 4 and 5.

The CPU 901, the ROM 902 and the RAM 903 are connected to one another by the host bus 904a including a CPU bus. The host bus 904a is connected to the external bus 904b such as a Peripheral Component Interconnect/Interface (PCI) bus through the bridge 904. Also, it is not necessary to configure the host bus 904a, the bridge 904 and the external bus 904b separately, but such functions may be implemented in one bus.

The input device 906 is implemented by a device to which information is input by the user, for example, a mouse, a keyboard, a touch panel, a button, a microphone, a switch and a lever. In addition, the input device 906 may be, for example, a remote control device using infrared rays or other radio waves, or may be an external connection device such as a mobile phone or a PDA corresponding to a manipulation of the information processing device 900. In addition, the input device 906 may be a visible light camera, an infrared camera, a stereo camera, a distance measuring sensor using a time of flight method, a distance measuring sensor using a structured light method, or a biometric sensor. Further, the input device 906 may include an input control circuit that generates an input signal based on information input by the user using, for example, the above input device, and outputs the signal to the CPU 901. The user of the information processing device 900 may input various types of data or instruct a process operation with respect to the information processing device 900 by manipulating the input device 906. The input device 906 may form, for example, the input unit 110 illustrated in FIGS. 4 and 5.

The output device 907 is formed as a device capable of visually or audibly notifying the user of the acquired information. Such a device includes a display device such as a projector, a CRT display device, a liquid crystal display device, a plasma display device, an EL display device and a lamp, an audio output device such as a speaker and a headphone, a printer device or the like. The output device 907 outputs results obtained by various processes performed by, for example, the information processing device 900. Specifically, the display device visually displays results obtained by various processes performed by the information processing device 900 in various forms such as text, an image, a table, or a graph. On the other hand, the audio output device converts an audio signal of reproduced audio data or acoustic data into an analog signal and audibly outputs the result. The display device and the audio output device may form, for example, the output unit 130 illustrated in FIGS. 4 and 5.

The storage device 908 is a device for data storage formed as an example of the storage unit of the information processing device 900. The storage device 908 is implemented by, for example, a magnetic storage device such as an HDD, a semiconductor storage device, an optical storage device or a magneto optical storage device. The storage device 908 may include a storage medium, a recording device configured to record data in the storage medium, a reading device configured to read data from the storage medium, and a deleting device configured to delete data recorded in the storage medium. The storage device 908 stores a program and various types of data executed by the CPU 901 and various types of data acquired from the outside. The storage device 908 may form, for example, the storage unit 150 illustrated in FIGS. 4 and 5.

The drive 909 is a reader/writer for the storage medium and is built in the information processing device 900 or externally attached. The drive 909 reads information recorded in a removable storage medium such as an installed magnetic disk, optical disc, magneto optical disc, or semiconductor memory, and outputs the information to the RAM 903. In addition, the drive 909 can write information in the removable storage medium.

The connection port 911 is an interface connected to an external device and is connection port of the external device capable of transmitting data through, for example, Universal Serial Bus (USB).

The communication device 913 is a communication interface formed in a communication device for connection with, for example, a network 920. The communication device 913 is a communication card for, for example, a wired or wireless local area network (LAN), Long Term Evolution (LTE), Bluetooth (registered trademark), or wireless USB (WUSB). In addition, the communication device 913 may be a router for optical communication, a router for Asymmetric Digital Subscriber Line (ADSL), or a modem for various types of communication. The communication device 913 can transmit and receive a signal or the like in compliant with a predetermined protocol, for example, TCP/IP, through, for example, the Internet, or with other communication devices. The communication device 913 may form, for example, the communication unit 160 and the communication unit 170 illustrated in FIG. 5.

Also, the network 920 is a wired or wireless transmission path of information that is transmitted from a device connected to the network 920. For example, the network 920 may include a public network such as the Internet, a telephone line network, and a satellite communication network, various types of local area networks (LANs) including Ethernet (registered trademark), and a wide area network (WAN). In addition, the network 920 may include a dedicated line network such as Internet Protocol-Virtual Private Network (IP-VPN).

The exemplary hardware configuration in which functions of the information processing device 900 according to an embodiment can be implemented has been illustrated above. The respective components described above may be implemented using a general purpose member or may be implemented by hardware that is specialized for functions of respective components. Therefore, it is possible to appropriately change a hardware configuration to be used according to a technical level when an embodiment is implemented.

Note that a computer program for implementing the above-described respective functions of the information processing device 900 according to an embodiment can be prepared and installed in a PC or the like. In addition, it is possible to provide a computer readable recording medium in which such a computer program is stored. The recording medium includes, for example, a magnetic disk, an optical disc, a magneto optical disc and a flash memory. In addition, the computer program may be delivered through, for example, a network, without using the recording medium.

5. SUMMARY

An embodiment of the present disclosure has been described above in detail with reference to FIGS. 1 to 26. As described above, the information processing system 100 according to an embodiment acquires information indicating a correspondence relation between the display object and the real object from the storage unit, and displays provided information corresponding to at least any of the display object and the real object recognized on the object surface on which the display object is displayed based on information indicating the correspondence relation. Therefore, the user can receive the provision of information of the real object corresponding to, for example, the display object that is displayed, and receive the provision of information of the display object corresponding to the real object placed on the display surface. For example, when the user places only the real object on the display surface, since an application having a high degree of association is automatically activated, it is possible to omit an activation step. In this manner, the user convenience may increase.

In addition, the information processing system 100 identifies the real object according to a captured image, 3D shape information, and a position map of the real object. Therefore, the information processing system 100 can identify a real object having no texture, real objects having the same appearance and different heights, and real objects having the same appearance and height and different use positions. In addition, the information processing system 100 can practically implement user recognition, which is difficult in image recognition using a camera configured to capture an image from above the user, using the position map. That is, when a use method is different even if the real object is the same, the information processing system 100 can display different provided information. In addition, since the information processing system 100 identifies the real object in a combination of the captured image, the 3D shape information, and the position map, recognition accuracy of the real object may increase compared to a recognition method using only the captured image. In addition, the information processing system 100 controls weight coefficients of Equation 1 used for recognition, and thus can optimize a use ratio of the captured image, the 3D shape information, and the position map according to a use environment. In the technique disclosed in Patent Literature 1 described above, since only an image is used for identification, it is difficult to identify a real object having no texture, real objects having the same appearance and different heights, and real objects having the same appearance and height and different use positions.

In addition, the information processing system 100 displays the provided information according to information indicating a relative arrangement included in the correspondence relation information. Therefore, the information processing system 100 can display the provided information in an appropriate arrangement seen from the real object, and display the provided information in an appropriate arrangement seen from the display object.

In addition, the information processing system 100 stores an entry associated with the combination of the recognized display object and real object in the correspondence relation DB. Therefore, even when the user is not aware of the association between the real object and the display object, the information processing system 100 can learn a usage state of the user and present information with high accuracy. In Patent Literature 1 described above, only presentation of information previously associated with an image is disclosed, and dynamic learning and updating of the correspondence relation is not disclosed.

In addition, the information processing system 100 may display provided information of another display object or another real object associated with at least any of the recognized display object and real object. For example, when the information processing system 100 refers to the cloud correspondence relation DB, it is possible to suggest an application that the user does not know, and a new product that matches a usage state of the table 140A. Further, when a third party registers advertisement information in the cloud correspondence relation DB, it is possible to recommend an application, a product or the like for the user, and perform customer development.

It should be understood by those skilled in the art that various modifications, combinations, sub-combinations and alterations may occur depending on design requirements and other factors insofar as they are within the scope of the appended claims or the equivalents thereof.

For example, in the embodiment, the example in which the information processing system 100 is used by a fixed user such as the husband or the wife was mainly described, but the present technology is not limited thereto. For example, the information processing system 100 may be installed in a restaurant or a cafe and used by a plurality of unspecified customers. In this case, for example, the information processing system 100 may recommend a meal menu according to an application activated by a customer and display information according to a drink that the customer drinks.

In addition, respective devices described in this specification may be implemented by a single device, or a part or all thereof may be implemented by separate devices. For example, the recognition unit 122, the storage control unit 124 and the display control unit 126 may be provided in separate devices.

In addition, in the embodiment, the example in which the recognition unit 122 recognizes the display object and the real object has been described, but the present technology is not limited thereto. For example, a first recognition unit configured to recognize the display object and a second recognition unit configured to recognize the real object may be provided. Further, the first recognition unit and the second recognition unit may be provided in separate devices.

Note that it is not necessary for the processing described in this specification with reference to the flowchart to be executed in the order shown in the flowchart. Some processing steps may be performed in parallel. Further, some of additional steps can be adopted, or some processing steps can be omitted. In addition, the process of the flowchart may be repeatedly performed or the process may end at any time according to an end interrupt.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1) An information processing apparatus, including:
circuitry configured to
control output of a first content according to first content information,
determine information related to a real object which is different from a manipulation body used for content selection or object manipulation by a user, and
control output of a second content, which is different from the first content, according to second content information,
wherein the second content information is based on the first content information and the determined information related to the real object.

(2) The information processing apparatus of (1), wherein the output of the first content includes a first display object.

(3) The information processing apparatus of (1) or (2), wherein the first content information includes a first display location of the first display object on a display surface.

(4) The information processing apparatus of any of (1) to (3), wherein the first content information includes identification information of the first display object.

(5) The information processing apparatus of any of (1) to (4), wherein the output of the second content includes a second display object.

(6) The information processing apparatus of any of (1) to (5), wherein the second content information includes a second display location of the second display object on the display surface.

(7) The information processing apparatus of any of (1) to (6), wherein the circuitry initiates display of the second display object when the information related to the real object indicates a spatial relationship between the real object and one or more components of the circuitry.

(8) The information processing apparatus of any of (1) to (7), wherein the spatial relationship with one or more components of the circuitry is a state in which the real object is worn or held by the user within a predetermined distance from one or more components of the circuitry.

(9) The information processing apparatus of any of (1) to (8), wherein the spatial relationship with one or more components of the circuitry is a state of being within a threshold distance from the display surface.

(10) The information processing apparatus of any of (1) to (9), wherein the spatial relationship with one or more components of the circuitry is a state of being in contact with the surface of the display area.

(11) The information processing apparatus of any of (1) to (10), wherein the information related to the real object is based on a captured image of the real object.

(12) The information processing apparatus of any of (1) to (11), wherein the captured image of the real object indicates a location of the real object with respect to one or more components of the circuitry.

(13) The information processing apparatus of any of (1) to (12), wherein the captured image of the real object indicates a shape of the real object.

(14) The information processing apparatus of any of (1) to (13), wherein the information related to the real object is based on a captured image of the real object.

(15) The information processing apparatus of any of (1) to (14), wherein the captured image of the real object indicates a location of the real object with respect to the display surface.

(16) The information processing apparatus of any of (1) to (15), wherein the circuitry initiates display of the second display object when the location of the real object is within a threshold distance from the display surface.

(17) The information processing apparatus of any of (1) to (16), wherein the circuitry initiates display of the second display object as suggested content with limited functional or display information, and upon determination by the user, the second display object is output with full functional and display information.

(18) The information processing apparatus of any of (1) to (17), wherein upon the determination by the user, the second display object and second display location are registered in association with a combination of the first content information and the determined information related to the real object, such that the second display object is output at the determined second display location with full functional and display information when the combination of the first content information and the determined information related to the real object is detected.

(19) The information processing apparatus of any of (1) to (18), wherein the second content information is further based on at least one of information of time and information of a user profile.

(20) The information processing apparatus of any of (1) to (19), wherein the second content information is further based on a user's biometric information.

(21) An information processing method including:
outputting a first content according to first content information;
determining information related to a real object which is different from a manipulation body used for content selection or object manipulation by a user; and
outputting a second content, which is different from the first content, according to second content information,
wherein the second content information is based on the first content information and the determined information related to the real object.

(22) A non-transitory computer-readable medium having embodied thereon a program, which when executed by a computer causes the computer to execute a method, the method including:
outputting a first content according to first content information;
determining information related to a real object which is different from a manipulation body used for content selection or object manipulation by a user; and
outputting a second content, which is different from the first content, according to second content information,
wherein the second content information is based on the first content information and the determined information related to the real object.

(23) An information processing system including:
a display control unit configured to cause provided information corresponding to at least any of a recognized display object and real object to be displayed on a display unit based on a recognition result of the display object and the real object on an object surface on which the display object is displayed.

(24) The information processing system according to (23),
wherein the display control unit causes the provided information to be displayed based on a position of the recognized display object or real object.

(25) The information processing system according to (24),
wherein the display control unit causes the provided information to be displayed based on positions of the recognized display object and real object.

(26) The information processing system according to any one of (23) to (25), wherein the provided information is generated based on a position of the recognized display object or a position of the recognized real object.

(27) The information processing system according to (26),
wherein the provided information is determined based on a position of the recognized display object and a position of the recognized real object.

(28) The information processing system according to (23),
wherein the display control unit causes the provided information to be displayed based on information indicating a correspondence relation between the display object and the real object.

(29) The information processing system according to (28),
wherein the information indicating the correspondence relation includes information indicating a relative arrangement between the real object and the display object, and wherein the display control unit causes the provided information to be displayed based on information indicating the relative arrangement.

(30) The information processing system according to (28) or (29), further including: a storage control unit configured to acquire the information indicating the correspondence relation from a storage unit.

(31) The information processing system according to (30),
wherein the storage control unit identifies the real object according to a captured image, information indicating a 3D shape, or information indicating a position at the object surface of the real object.

(32) The information processing system according to (31),
wherein the storage control unit identifies the real object according to information indicating a time period in which the real object is detected.

(33) The information processing system according to any one of (30) to (32),
wherein the storage control unit causes the information indicating the correspondence relation associated with a combination of the recognized display object and real object to be stored in the storage unit.

(34) The information processing system according to any one of (28) to (33),
wherein the provided information is information of the display object associated with the recognized real object in information indicating the correspondence relation.

(35) The information processing system according to any one of (28) to (34),
wherein the provided information is information of the display object associated with the recognized display object in information indicating the correspondence relation.

(36) The information processing system according to (35),
wherein the display control unit causes the provided information to be preferentially displayed based on the information indicating the correspondence relation of a combination of the display object and the real object that have been recognized many times or for a long time.

(37) The information processing system according to any one of (23) to (36),
wherein, when the real object or the display object is recognized, the display control unit causes the provided information to be displayed after a specified time lag.

(38) The information processing system according to any one of (23) to (37),
wherein the display control unit causes advertisement information associated with at least any of the recognized display object and real object to be displayed.

(39) The information processing system according to any one of (23) to (38),
wherein the display control unit causes the provided information to be displayed according to a user's recognized biometric information.

(40) The information processing system according to any one of (23) to (17),
wherein the display control unit causes the provided information to be displayed according to a recognized device near the user.

(41) An information processing method including:
controlling, by a processor, provided information corresponding to at least any of a recognized display object and real object to be displayed on a display unit based on a recognition result of the display object and the real object on an object surface on which the display object is displayed.

(42) A program causing a computer to function as a display control unit configured to cause provided information corresponding to at least any of a recognized display object and real object to be displayed on a display unit based on a recognition result of the display object and the real object on an object surface on which the display object is displayed.

(43) A server including:
a display control unit configured to generate a display control signal for causing provided information corresponding to at least any of a recognized display object or real object to be displayed on a display unit based on a recognition result of the display object and the real object on an object surface on which the display object is displayed.

(44) The information processing system according to any one of (28) to (36),
wherein the display control unit causes the provided information to be displayed based on information indicating the correspondence relation in another information processing system.

(45) The information processing system according to (44),
wherein the display control unit causes the provided information to be displayed based on information indicating the correspondence relation of another user who is similar to a recognized user.

REFERENCE SIGNS LIST

100 information processing system
110 input unit
120 control unit
122 recognition unit
124 storage control unit
126 display control unit
130 output unit
140 table
150 storage unit
160 communication unit
170 communication unit
200 input and output device
300 server

The invention claimed is:
1. An information processing apparatus, comprising:
circuitry configured to
control output of a first display object according to first content information,
determine information related to a real object which is different from a manipulation body used for content selection or object manipulation by a user, and
control output of a second display object, which is different from the first display object, according to second content information,
wherein the circuitry controls the output of at least one of the first display object or the second display object based on registered correspondence relation information indicating a degree of association between the first or second content information and the determined information related to the real object, and
wherein the circuitry controls a transparency of the output of the second display object based on the registered correspondence relation information, and upon a determination by the user to activate a semitransparent display object suggestion for the second display object, the second display object is output with full functional and display information.

2. The information processing apparatus according to claim 1, wherein the first content information comprises a first display location of the first display object on a display surface.

3. The information processing apparatus according to claim 2, wherein the second content information comprises a second display location of the second display object on the display surface.

4. The information processing apparatus according to claim 3, wherein the circuitry initiates display of the second display object when the information related to the real object indicates a spatial relationship between the real object and one or more components of the circuitry.

5. The information processing apparatus according to claim 4, wherein the spatial relationship with one or more components of the circuitry comprises a state in which the real object is worn or held by the user within a predetermined distance from one or more components of the circuitry.

6. The information processing apparatus according to claim 4, wherein the spatial relationship with one or more components of the circuitry comprises a state of being within a threshold distance from the display surface.

7. The information processing apparatus according to claim 4, wherein the spatial relationship with one or more components of the circuitry comprises a state of being in contact with the display surface.

8. The information processing apparatus according to claim 3, wherein the information related to the real object is based on a captured image of the real object.

9. The information processing apparatus according to claim 8, wherein the captured image of the real object indicates a location of the real object with respect to the display surface.

10. The information processing apparatus according to claim 9, wherein the circuitry initiates display of the second display object when the location of the real object is within a threshold distance from the display surface.

11. The information processing apparatus according to claim 3, wherein upon the determination by the user, the second display object and second display location are registered in association with a combination of the first content information and the determined information related to the real object, such that the second display object is output at the determined second display location with full functional and display information when the combination of the first content information and the determined information related to the real object is detected.

12. The information processing apparatus according to claim 1, wherein the first content information comprises identification information of the first display object.

13. The information processing apparatus according to claim 1, wherein the information related to the real object is based on a captured image of the real object.

14. The information processing apparatus according to claim 13, wherein the captured image of the real object indicates a location of the real object with respect to one or more components of the circuitry.

15. The information processing apparatus according to claim 13, wherein the captured image of the real object indicates a shape of the real object.

16. The information processing apparatus according to claim 1, wherein the second content information is further based on at least one of information of time or information of a user profile.

17. The information processing apparatus according to claim 1, wherein the second content information is further based on a user's biometric information.

18. The information processing apparatus according to claim 1, wherein the registered correspondence relation information is determined using at least one of
- a local correspondence database based on one or more prior associations between the first content information and the determined information related to the real object by the user, or
- a cloud correspondence database based on more prior associations between the first content information and the determined information related to the real object by another user.

19. The information processing apparatus according to claim 1,
- wherein when the registered correspondence relation information indicates that the degree of association between the second content information and the determined information related to the real object is less than a threshold degree, the circuitry controls the output of the second display object to be the semitransparent display object suggestion for activation by the user, and
- wherein when the registered correspondence relation information indicates that the degree of association between the first content information and the determined information related to the real object is greater than or equal to the threshold degree, the circuitry controls the output of the second display object to be automatically activated with full functional and display information.

20. An information processing method comprising:
- outputting a first display object according to first content information;
- determining information related to a real object which is different from a manipulation body used for content selection or object manipulation by a user; and
- outputting a second display object, which is different from the first display object, according to second content information,
- wherein the outputting of at least one of the first display object or the second display object is based on registered correspondence relation information indicating a degree of association between the first or second content information and the determined information related to the real object, and
- wherein a transparency of the second display object is controlled based on the registered correspondence relation information, and upon a determination by the user to activate a semitransparent display object suggestion for the second display object, the second display object is output with full functional and display information.

21. A non-transitory computer-readable medium having embodied thereon a program, which when executed by a computer causes the computer to execute a method, the method comprising:
- outputting a first display object according to first content information;
- determining information related to a real object which is different from a manipulation body used for content selection or object manipulation by a user; and
- outputting a second display object, which is different from the first display object, according to second content information,
- wherein the outputting of at least one of the first display object or the second display object is based on registered correspondence relation information indicating a degree of association between the first or second content information and the determined information related to the real object, and
- wherein a transparency of the second display object is controlled based on the registered correspondence relation information, and upon a determination by the user to activate a semitransparent display object suggestion for the second display object, the second display object is output with full functional and display information.

* * * * *